(12) United States Patent
Lim

(10) Patent No.: US 11,687,201 B2
(45) Date of Patent: Jun. 27, 2023

(54) ELECTRONIC APPARATUS INCLUDING A DISPLAY PANEL

(71) Applicant: SAMSUNG DISPLAY CO., LTD., Yongin-si (KR)

(72) Inventor: Sanghyun Lim, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/363,858

(22) Filed: Jun. 30, 2021

(65) Prior Publication Data

US 2022/0075482 A1 Mar. 10, 2022

(30) Foreign Application Priority Data

Sep. 7, 2020 (KR) .................. 10-2020-0113970

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC ................ G06F 3/0446; G06F 3/0412; G06F 2203/04111
See application file for complete search history.

(56) References Cited

U.S. PATENT DOCUMENTS

| 7,864,160 | B2 | 1/2011 | Geaghan et al. |
| 8,477,120 | B2 | 7/2013 | Jang et al. |
| 8,947,370 | B2 | 2/2015 | An et al. |
| 2018/0321773 | A1 | 11/2018 | Yang |
| 2021/0232247 | A1* | 7/2021 | Tao ..................... G06F 3/04164 |

FOREIGN PATENT DOCUMENTS

| KR | 10-1219273 | 1/2013 |
| KR | 10-2016-0022620 | 3/2016 |
| KR | 10-1726623 | 4/2017 |

* cited by examiner

*Primary Examiner* — Deeprose Subedi
(74) *Attorney, Agent, or Firm* — F. Chau & Associates, LLC

(57) ABSTRACT

An electronic apparatus includes a display panel, and an input sensor disposed on the display panel and including a first electrode, a second electrode, a first sensing line connected to the first electrode, and a second sensing line connected to the second electrode. The first electrode includes first patterns, which are spaced apart from each other and include a first side and a second side that is longer than the first side and first bridge patterns disposed between the first patterns spaced apart from each other. The second electrode includes second patterns, which are spaced apart from each other and include a third side and a fourth side that is longer than the third side and second bridge patterns disposed between the second patterns spaced apart from each other. The first side faces the fourth side, and the second side faces the third side.

19 Claims, 21 Drawing Sheets

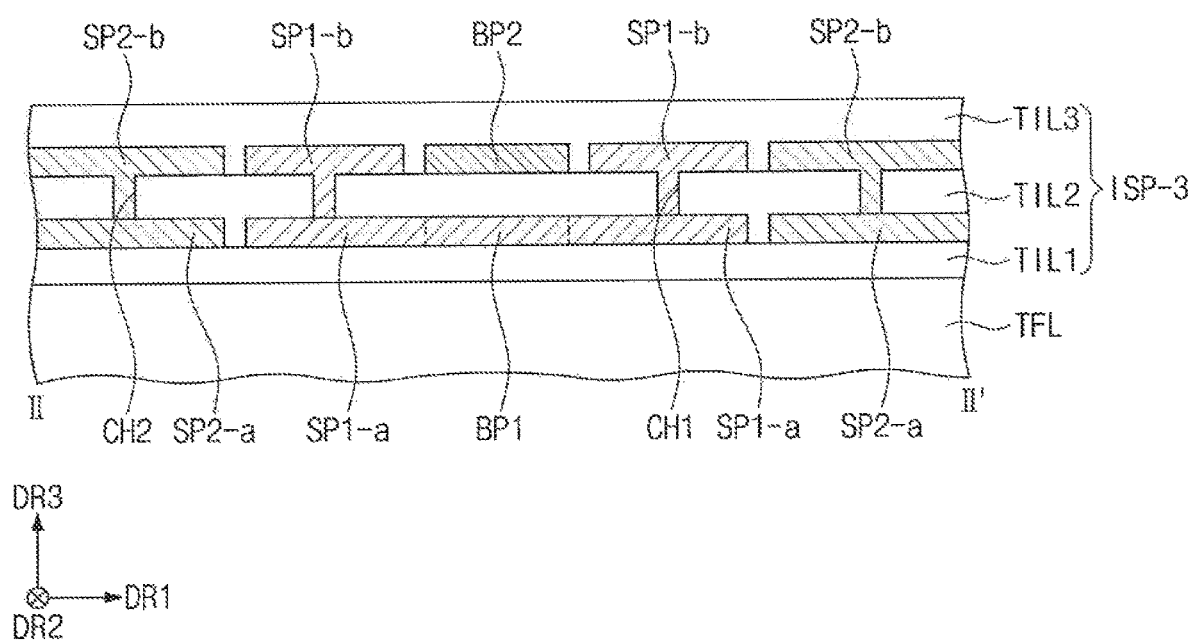

ELECTRONIC APPARATUS INCLUDING A DISPLAY PANEL

CROSS-REFERENCE TO RELATED APPLICATIONS

This U.S. non-provisional patent application claims priority under 35 U.S.C. § 119 of Korean Patent Application No. 10-2020-0113970, filed on Sep. 7, 2020, the entire contents of which are hereby incorporated by reference.

BACKGROUND

The present inventive concept relates to an electronic apparatus, and more particularly, to an electronic apparatus having improved sensing performance.

Multimedia electronic apparatuses such as televisions, mobile phones, tablet computers, navigators, game consoles, and the like includes a display device for displaying an image. Such an electronic apparatus may include an input sensor, which is capable of providing a touch-based input manner that allows a user to easily input information or commands intuitively and conveniently in addition to input manners such as a button, a keyboard, a mouse, and the like.

The input sensor may sense a touch or pressure applied by a user's body (e.g., a finger). There is an increasing demand for using an active pen for fine touch input for a user who is familiar with information input using a writing instrument or a specific application program (for example, application program for sketching or drawing).

SUMMARY

The present disclosure provides an electronic apparatus having improved sensing performance with respect to both a passive type input and an active type input.

An embodiment of the inventive concept provides an electronic apparatus including a display panel, and an input sensor disposed on the display panel and including a first electrode extending in a first direction, a second electrode extending in a second direction crossing the first direction and insulated from the first electrode, a first sensing line connected to the first electrode, and a second sensing line connected to the second electrode. The first electrode includes first patterns, which are spaced apart from each other, and each first pattern including a first side and a second side that is longer than the first side, and first bridge patterns, each first bridge pattern being disposed between a corresponding pair of two first patterns adjacent to each other. The second electrode includes second patterns, which are spaced apart from each other, and each second pattern including a third side and a fourth side that is longer than the third side, and second bridge patterns, each second bridge pattern being disposed between a corresponding pair of two second patterns adjacent to each other. The first side faces the fourth side, and the second side faces the third side.

The first electrode and the second electrode crosses each other at a node region, and a first number of first patterns among the plurality of first patterns and a second number of second patterns among the plurality of second patterns are disposed in the node region.

In an embodiment, the first number of the first patterns and the second number of the second patterns are the same as each other.

In an embodiment, the first number of the first patterns and the second number of the second patterns are different from each other.

In an embodiment, the first side and the fourth side extend in the second direction, and the second side and the fourth side extend in the first direction.

In an embodiment, the first bridge patterns and the second bridge patterns extend in a diagonal direction between the first direction and the second direction.

In an embodiment, the first side and the fourth side extend in a first diagonal direction between the first direction and the second direction, and the second side and the third side extend in a second diagonal direction, different from the first diagonal direction, between the first direction and the second direction.

In an embodiment, the plurality of first patterns include a first pattern with a first pattern hole, and the plurality of second patterns include a second pattern with a second pattern hole.

In an embodiment, the electronic apparatus further include a first dummy pattern within the first pattern hole of the first pattern and insulated from the first pattern, and a second dummy pattern within the second pattern hole of the second pattern and insulated from the second pattern.

In an embodiment, wherein the plurality of first patterns include a third pattern with a third pattern hole, and the first pattern hole and the second pattern hole have areas different from each other.

In an embodiment, the plurality of first patterns include a first pattern with a first recess which is inwardly recessed from the second side, and the plurality of second patterns include a second pattern with a second recess which is inwardly recessed from the fourth side.

In an embodiment, the electronic apparatus further includes a first dummy pattern disposed in the first recess of the first pattern and insulated from the first pattern, and a second dummy pattern disposed in the second recess of the second pattern and insulated from the second pattern.

In an embodiment, each of the plurality of first patterns includes a plurality of first mesh lines which are extend in a diagonal direction between the first direction and the second direction and a plurality of first mesh openings which are defined by the plurality of first mesh lines, and each of the plurality of second patterns includes a plurality of second mesh lines which are extend in a diagonal direction between the first direction and the second direction and a plurality of second mesh openings which are defined by the plurality of second mesh lines.

In an embodiment, each of the plurality of first patterns includes a body of which an outer boundary is of a rectangular shape, and a first protrusion protruding from a first portion of the outer boundary of the body.

In an embodiment, each of the plurality of first patterns further includes a second protrusion protruding from a second portion of the outer boundary of the body and spaced apart from the first protrusion, the first protrusion is connected to a corresponding bridge pattern of the plurality of first bridge patterns, and the second protrusion is connected to a corresponding bridge pattern of the plurality of first bridge patterns.

In an embodiment, the display panel includes a base layer, a circuit element layer disposed on the base layer and comprising at least one transistor, a display element layer comprising a light emitting element connected to the transistor, and an upper insulating layer covering the display element layer. The input sensor is directly disposed on the upper insulating layer.

In an embodiment, the input sensor include a first sensor insulating layer disposed on the display panel, a first conductive layer disposed on the first sensor insulating layer; a second sensor insulating layer disposed on the first sensor insulating layer to cover the first conductive layer, and a second conductive layer disposed on the second sensor insulating layer.

In an embodiment, the first conductive layer includes the first bridge patterns, the second conductive layer includes the first patterns, the second patterns, and the second bridge patterns, and each first bridge pattern of the plurality of first bridge patterns is connected to the corresponding pair of two first patterns through of a corresponding pair of two contact holes, respectively, which pass through the second sensor insulating layer.

In an embodiment, the plurality of first patterns include a plurality of first upper patterns and a plurality of first lower patterns, each first upper pattern vertically overlapping a corresponding first lower pattern of the plurality of first lower patterns and having the same as the corresponding first lower pattern, and each of the plurality of first bridge patterns connecting a pair of two first lower patterns, adjacent to each other, among the plurality of first lower patterns. The plurality of second patterns include a plurality of second upper patterns and a plurality of second lower patterns, each second upper pattern vertically overlapping a corresponding second lower pattern of the plurality of second lower patterns and having the same as the corresponding second lower pattern, and each of the plurality of second bridge patterns connecting a pair of two second upper patterns, adjacent to each other, among the plurality of second upper patterns. The first conductive layer includes the plurality of first lower patterns, the plurality of first bridge patterns, and the plurality of second lower patterns. The second conductive layer includes the plurality of first upper patterns, the plurality of second upper patterns, and the plurality of second bridge patterns.

In an embodiment, each of the plurality of first upper patterns is connected to a corresponding one of the plurality of first lower patterns through a first contact hole pass through the second sensor insulating layer. Each of the plurality of second upper patterns is connected to a corresponding one of the plurality of second lower patterns through a second contact hole passing through the second sensor insulating layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 18 is a cross-sectional view of the input sensor, taken along line II-II' of FIG. 5B according to an embodiment of the inventive concept.

DETAILED DESCRIPTION

Figure 1A:
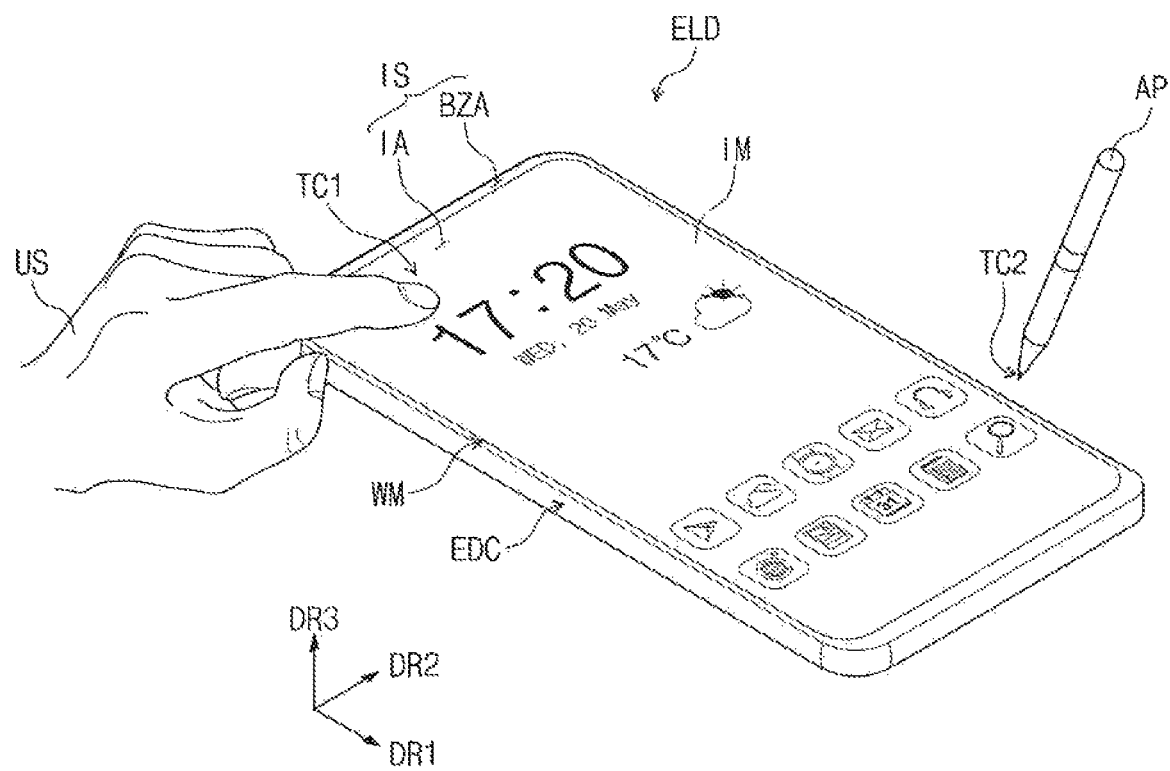
FIG. 1A is a perspective view of an electronic apparatus according to an embodiment of the inventive concept.

In this specification, it will also be understood that when one component (or area, layer, portion, etc.) is referred to as being 'on', 'connected to', or 'coupled to' another component, it can be directly disposed/connected/coupled on/to the one component, or an intervening third component may also be present.

Like reference numerals refer to like elements throughout. In the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

The terms "under", "below", "above", "upper", and the like are used for explaining relation association of components illustrated in the drawings. The terms may be a relative concept and described based on directions expressed in the drawings.

Unless otherwise defined, all terms (including technical and scientific terms) used herein have the same meaning as commonly understood by a person of ordinary skill in the art to which this invention belongs. The terms such as defined terms in commonly used dictionaries are to be interpreted as having meanings consistent with meaning in the context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations thereof. Hereinafter, exemplary embodiments of the inventive concept will be described with reference to the accompanying drawings.

Figure 1B:
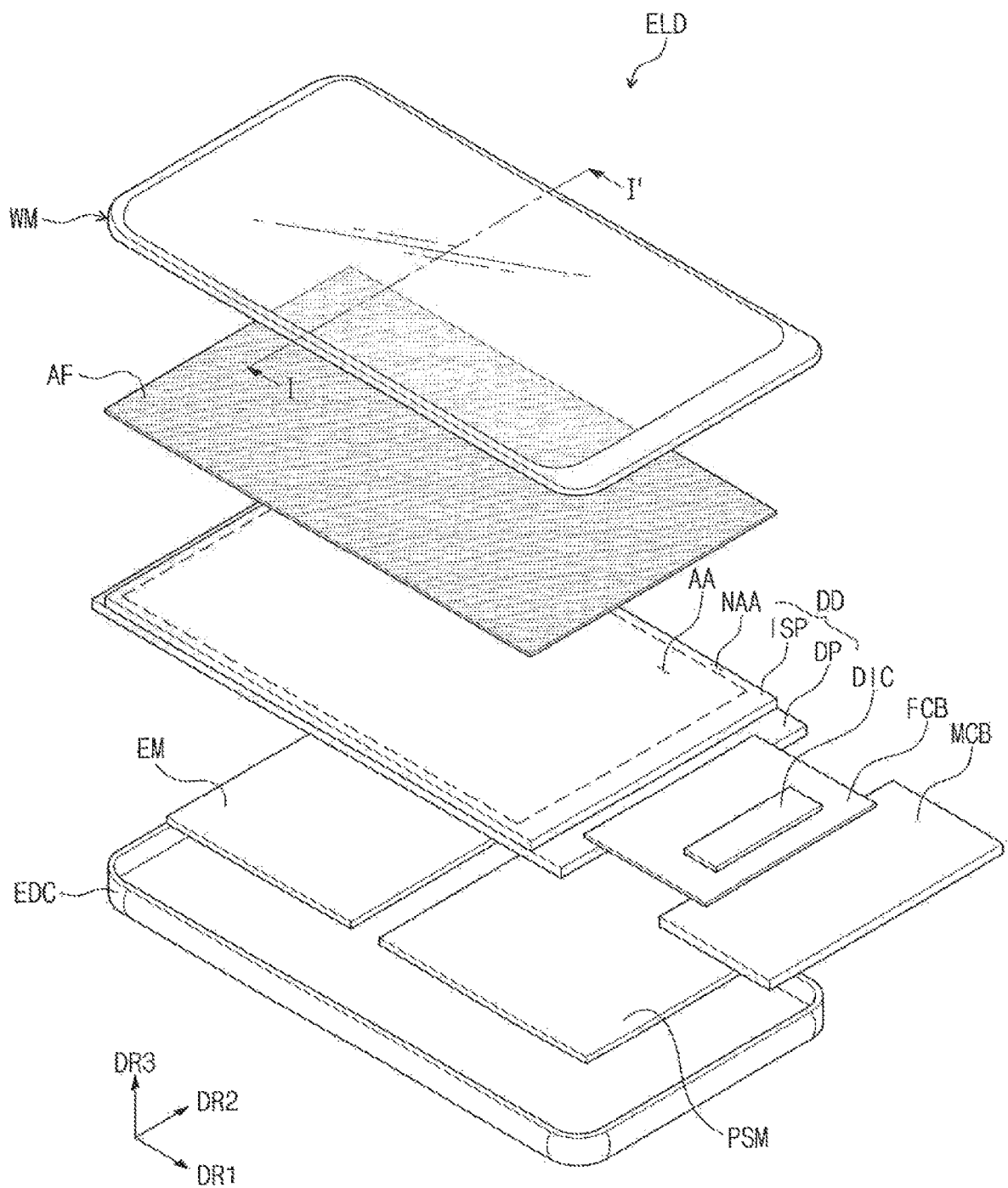
FIG. 1B is an exploded perspective view of the electronic apparatus according to an embodiment of the inventive concept.
Figure 2A:
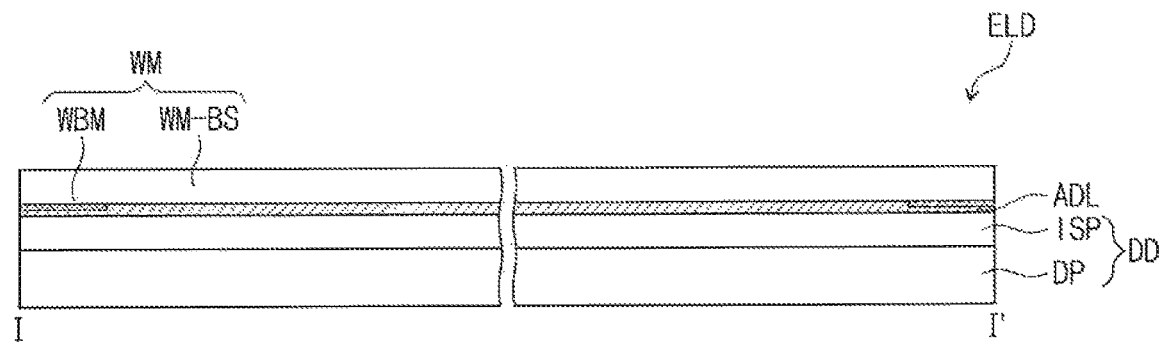
FIGS. 2A and 2B are cross-sectional views of the electronic apparatus, taken along line I-I' of FIG. 1B.
Figure 2A:
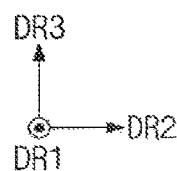
Figure 2B:
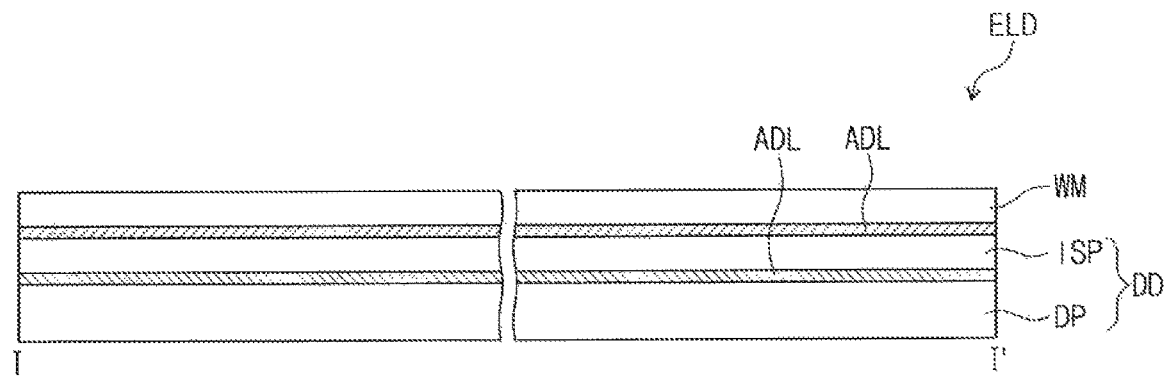
Figure 2B:
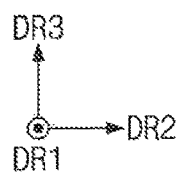
Figure 2C:
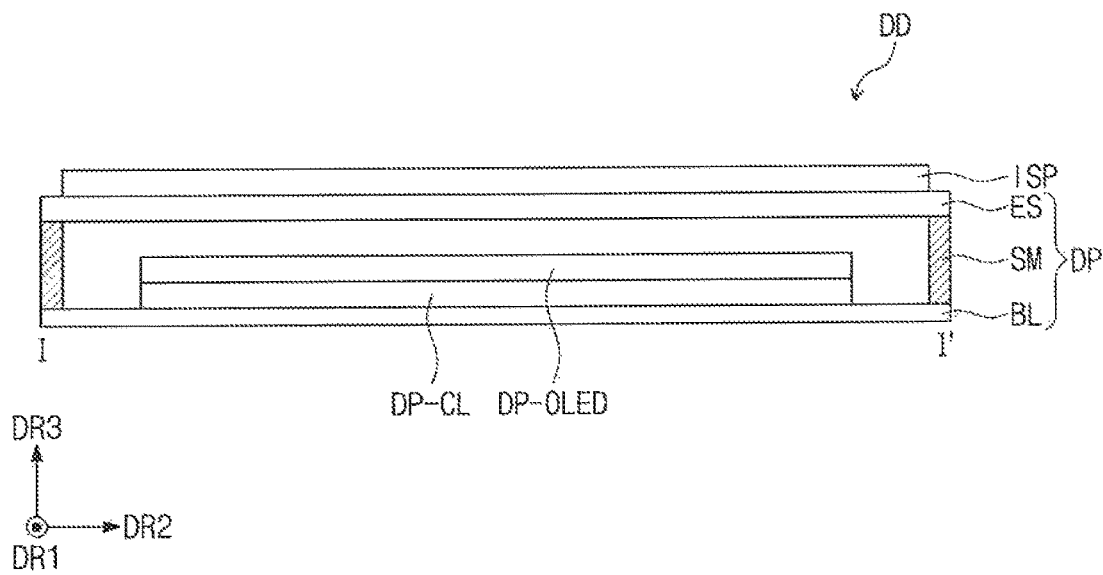
FIGS. 2C and 2D are cross-sectional views of a display device, taken along line I-I' of FIG. 1B.
Figure 2D:
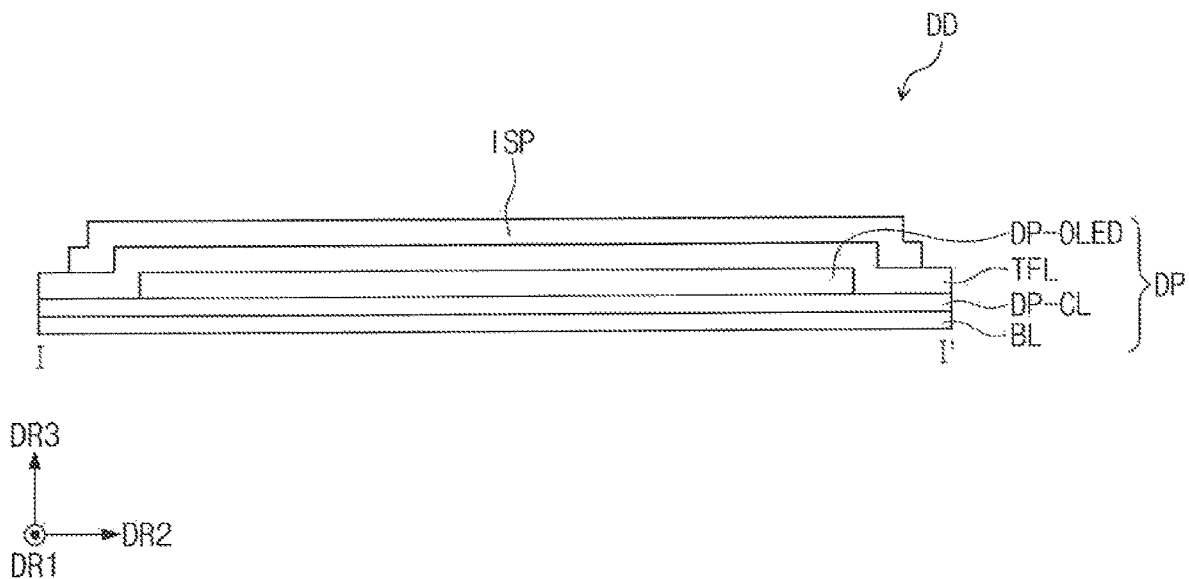
Figure 3A:
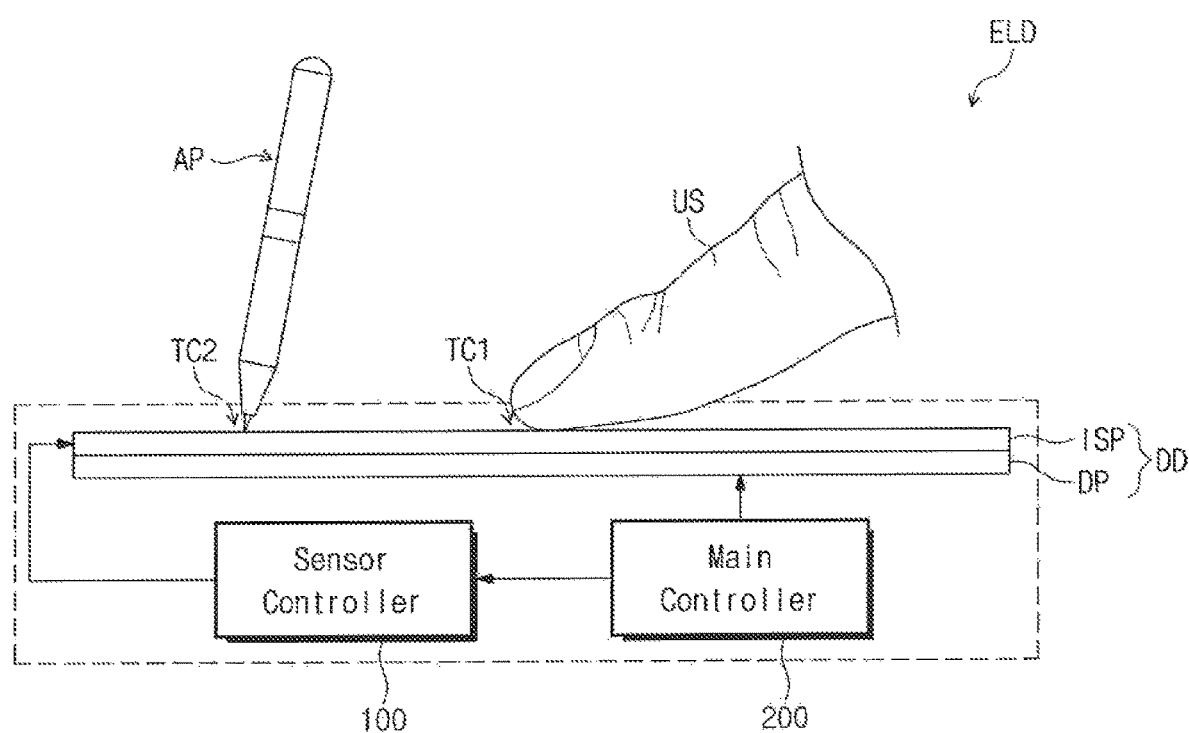
FIG. 3A is a block diagram for explaining an operation of the electronic apparatus according to an embodiment of the inventive concept.
Figure 3B:
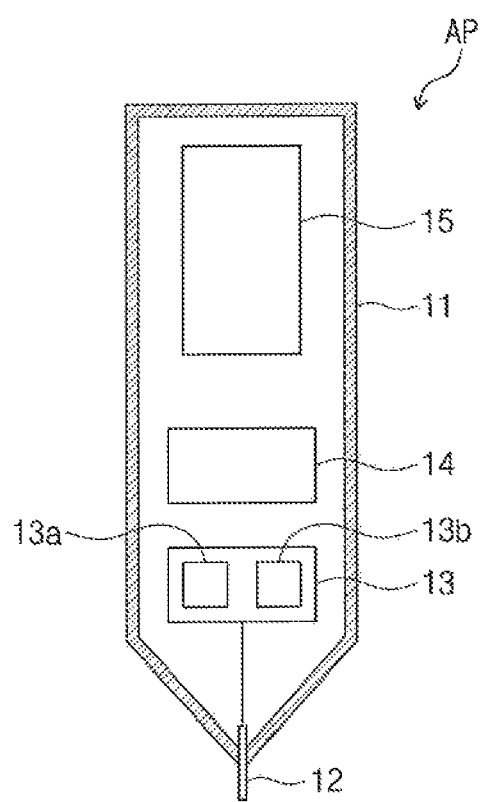
FIG. 3B is a block diagram of an input device of FIG. 3A.

FIG. 1A is a perspective view of an electronic apparatus according to an embodiment of the inventive concept. FIG. 1B is an exploded perspective view of the electronic apparatus according to an embodiment of the inventive concept. FIGS. 2A and 2B are cross-sectional views of the electronic apparatus, taken along line I-I' of FIG. 1B. FIGS. 2C and 2D are cross-sectional views of a display device, taken along line I-I' of FIG. 1B. FIG. 3A is a block diagram for explaining an operation of the electronic apparatus according to an embodiment of the inventive concept. FIG. 3B is a block diagram of an input device of FIG. 3A.

Referring to FIGS. 1A and 1B, an electronic apparatus ELD may be an apparatus that is activated according to an electrical signal. The electronic apparatus ELD may include various examples. For example, the electronic apparatus ELD may be applied to a smart phone, a tablet, a notebook, a computer, a smart television, and the like.

The electronic apparatus ELD may display an image IM in a third direction DR3 on a display surface IS parallel to each of first and second directions DR1 and DR2. The display surface IS on which the image IM is displayed may correspond to a front surface of the electronic apparatus ED. The image IM may include a still image as well as a dynamic image.

A front surface (or a top surface) or a rear surface (or a bottom surface) of each of members may be defined based on a direction in which the image IM is displayed. The front and rear surfaces may be opposite to each other in the third direction DR3. A normal direction of each of the front and rear surfaces may be parallel to the third direction DR3.

A distance between the front and rear surfaces in the third direction DR3 may correspond to a thickness of the electronic apparatus ELD in the third direction DR3. The directions indicated as the first to third directions DR1, DR2, and DR3 may be defined differently from the directions defined in FIG. 1A.

The electronic apparatus ELD may sense an external input applied from the outside. The external input may include various inputs provided from the outside of the electronic apparatus ELD. The electronic apparatus ELD according to an embodiment of the inventive concept may sense a first input TC1, which is applied from the outside. The first input TC1 may be an input by the body of a user US as an input by a passive-type input unit and also may include inputs that are capable of changing capacitance. The electronic apparatus ELD may sense the first input TC1 of the user US, which is applied to a side or rear surface of the electronic apparatus ED, according to a structure of the electronic apparatus ED, but is not limited to a specific embodiment.

The electronic apparatus ELD may sense a second input TC2 that is different type from that of the first input TC1. The second input TC2 may be an input by an active type input unit AP. The input unit AP may provide a driving signal to the input sensor ISP.

A front surface of the electronic apparatus ELD may include an image area TA and a bezel area BZA. The image area IA may be an area on which an image IM is displayed.

A user may visually recognize the image IM through the image area IA. Each of vertexes of the image area IA may have a rounded rectangular shape. However, this is merely an example. For example, the image area IA may have various shapes and is not limited to a specific embodiment.

The bezel area BZA is adjacent to the image area IA. The bezel area BZA may have a predetermined color. The bezel area BZA may surround the image area IA. Thus, the shape of the image area IA may be substantially defined by the bezel area BZA. However, this is merely an example. For example, the bezel area BZA may be disposed adjacent to only one side of the image area IA or be omitted. The electronic apparatus ELD according to an embodiment of the inventive concept may be implemented according to various embodiments, but is not limited to a specific embodiment.

As illustrated in FIG. 1B, the electronic apparatus ELD may include a display device DD, an optical member AF, a window WM, an electronic module EM, a power module PSM, and a case EDC. The display device DD generates an image and senses an external input. The display device DD may include a display panel DP and an input sensor ISP. The display device DD includes an active area AA and a peripheral area NAA, which respectively correspond to the image area IA (see FIG. 1A) and the bezel area BZA (see FIG. 1A) of the electronic apparatus ELD.

The display panel DP is not particularly limited and may be, for example, a light emitting display panel such as an organic light emitting display panel or a quantum dot light emitting display panel. The input sensor ISP will be described later in detail.

The display device DD may include a main circuit board MCB, a flexible circuit film FCB, and a driving chip DIC. One of the above-described components may be omitted. The main circuit board MCB may be connected to the flexible circuit board FCB and electrically connected to the display panel DP. The main circuit board MCB may include a plurality of driving elements (e.g., driving circuits). The plurality of driving elements may include an integrated chip for driving or operating the display panel DP. The main circuit board MCB may be electrically connected to the electronic module EM through a connector.

The flexible printed circuit board FCB is connected to the display panel DP to electrically connect the display panel DP to the main circuit board MCB. The flexible circuit film FCB may be bent so that the main circuit board MCB faces the rear surface of the display device DD. The driving chip DIC may be mounted on the flexible circuit film FCB. The driving chip DIC may include driving elements for driving or operating pixels of the display panel DP, for example, a data driving circuit.

FIG. 1B illustrates a structure in which the driving chip DIC is mounted on the flexible circuit film FCB, but the embodiment of the inventive concept is not limited thereto. For example, the driving chip DIC may be mounted on the display panel DP. In an embodiment, the driving chip DIC is directly mounted on the display panel DP. A portion of the display panel DP may be bent, and a portion on which the driving chip DIC is mounted may be disposed to face the rear surface of the display device DD.

Although not shown, the input sensor ISP may be electrically connected to the main circuit board MCB through an additional flexible circuit film. However, the embodiment of the inventive concept is not limited thereto. The input sensor ISP may be electrically connected to the display panel and electrically connected to the main circuit board MCB through the flexible circuit film FCB.

The optical member AF may reduce reflectivity of external light. The optical member AF may include a polarizer and a retarder. The polarizer and the retarder may be a stretch type or coating type. In the coating type optical film, an optical axis is defined according to the stretching direction of the functional film. The coating type optical film may include liquid crystal molecules arranged on the base film.

In an embodiment of the inventive concept, the optical member AF may be omitted. The display device DD may further include a color filter and a black matrix replacing the optical member AF. The window WM is provided on an outer surface of the electronic apparatus ELD. The window WM includes a base substrate and may further include functional layers such as an anti-reflection layer and an anti-fingerprint layer.

Although not shown separately, the display device DD may further include at least one adhesive layer. The adhesive layer may bond adjacent components of the display device DD to each other. The adhesive layer may be an optically transparent adhesive layer or a pressure sensitive adhesive layer.

The electronic module EM includes at least a main controller. The electronic module EM may include a wireless communication module, an image input module, an audio input module, an audio output module, a memory, and an external interface module. The modules may be mounted on the circuit board or may be electrically connected to each other through the flexible circuit board. The electronic module EM is electrically connected to the power module PSM.

The main controller controls an overall operation of the electronic apparatus ELD. For example, the main controller activates or deactivates the display device DD according to a user input. The main controller may control operations of the display device DD, the wireless communication module, the image input module, the sound input module, and the sound output module. The main controller may include at least one microprocessor.

The case EDC may be coupled to the window WM. The case EDC absorbs an impact applied from the outside and prevents foreign substances/moisture from being introduced into the display device DD to protect the components accommodated in the case EDC. In an embodiment of the inventive concept, the case EDC may be provided in a shape in which a plurality of accommodation members are coupled to each other.

Although not shown, the electronic apparatus ELD according to the inventive concept may operate in an in-folding state in which different portions of the display surface IS face each other with respect to the folding axis extending in the first direction DR1 or the second direction DR2 or operate in an out-folding state in which different portions of the case EDC face each other, but is not limited thereto.

Referring to FIG. 2A, the input sensor ISP may be directly disposed on the display panel DP. In an embodiment, the input sensor ISP is directly disposed on the display panel DP. According to an embodiment of the inventive concept, the input sensor ISP may be disposed on the display panel DP through a continuous process. That is, when the input sensor ISP is directly disposed on the display panel DP, an adhesive layer may not be disposed between the input sensor ISP and the display panel DP.

However, as illustrated in FIG. 2B, the adhesive layer ADL may be disposed between the input sensor ISP and the display panel DP. The input sensor ISP may not be manufactured together with the display panel DP in a continuous process. For example, after being manufactured through a process separate from the process of forming the display panel DP, the input sensor ISP may be fixed to a top surface of the display panel by the adhesive layer ADL. In FIGS. 2A and 2B, the optical member AF illustrated in FIG. 1B is not shown. A constituent disposed under the display device DD is not shown.

As illustrated in FIG. 2A, the window WM may include a light blocking pattern WBM for defining the bezel area BZA (see FIG. 1A). The light blocking pattern WBM may be a colored organic film, for example, which is disposed on one surface of the base layer WM-BS in a coating manner.

As illustrated in FIG. 2C, the display panel DP may include a base layer BL, a circuit element layer DP-CL disposed on the base layer BL, a display element layer DP-OLED, an encapsulation layer EC, and a sealant coupling the base layer BL to the encapsulation layer EC.

The base layer BL may include at least one plastic film. The base layer BL may include a plastic substrate, a glass substrate, a metal substrate, or an organic/inorganic composite substrate. The base layer BL may be a thin film glass substrate having a thickness of several tens to several hundreds of micrometers. The base layer BL may have a multilayered structure. For example, the base layer BL may include or may be formed of a polyimide film, at least one inorganic layer, or a combination thereof.

The circuit element layer DP-CL includes at least one insulating layer and a circuit element. The insulating layer includes at least one inorganic layer and at least one organic layer. The circuit element includes signal lines, a driving circuit of the pixel, and the like. This will be described later in detail.

The display element layer DP-OLED may include at least light emitting element. The display element layer DP-OLED may further include an organic layer such as a pixel defining layer.

The encapsulation layer EC may be spaced apart from the display element layer DP-OLED at a predetermined gap GP. Each of the base layer BL and the encapsulation layer EC may include a plastic substrate, a glass substrate, a metal substrate, or an organic/inorganic composite substrate. The sealant SM may include an organic adhesive or frit. A predetermined material may be filled in the gap GP. A desiccant or resin material may be filled in the gap GP.

As illustrated in FIG. 2D, the display panel DP may include a base layer BL, a circuit element layer DP-CL disposed on the base layer BL, a display element layer DP-OLED, and an upper insulating layer TFL. The upper insulating layer TFL may include a plurality of thin films. The upper insulating layer TFL may include a protective layer for protecting the light emitting element. The upper insulating layer TFL may include a thin film encapsulation layer including at least an inorganic layer/organic layer/inorganic layer. For example, the thin film encapsulation layer may be a multi-layer of a first inorganic layer, a second inorganic layer, an organic layer therebetween. The first and second inorganic layers may be different inorganic layers or the same inorganic layer. The thin film encapsulation layer may be disposed on the protective layer.

FIG. 3A is a block diagram for explaining an operation of the electronic apparatus ELD according to an embodiment of the inventive concept, and FIG. 3B is a block diagram of an input unit AP of FIG. 3A.

Referring to FIGS. 3A and 3B, the electronic apparatus ELD according to an embodiment of the inventive concept may include a main controller 200 for controlling driving of the display device DD and a sensor controller 100 connected to the input sensor ISP. The main controller 200 may control driving of the sensor controller 100.

According to an embodiment of the inventive concept, the main controller 200 and the sensor controller 100 may be mounted on the main circuit board MCB (see FIG. 1B). According to an embodiment of the inventive concept, the sensor controller 100 may be embedded in the driving chip DIC (see FIG. 1B).

The input sensor ISP may include electrodes. The electrodes may include first electrodes and second electrodes. The structure of the input sensor ISP will be described later.

The sensor controller 100 may be connected to the electrodes of the input sensor ISP. The sensor controller 100 may allow the input sensor ISP to operate in a first mode to sense the first input TC1 (see FIG. 1A) and also allow the input sensor ISP to operate in a second mode to sense the second input TC2 (see FIG. 1A). The operations of the first mode and the second mode may be performed alternately or may be performed in different sections by a preset manner.

As illustrated in FIG. 3B, the input unit AP may include a housing 11, a conductive tip 12, and a communication module 13. The housing 11 may have a pen shape, and an accommodation space may be defined in the housing 11. The conductive tip 12 may protrude outward from an open, end portion of the housing 11. The conductive tip 12 may be a portion of the input unit AP, which contacts the input sensor ISP.

The communication module 13 may include a transmission circuit 13*a* and a reception circuit 13*b*. The transmission circuit 13*a* may transmit a downlink signal to the sensor controller 100. The downlink signal may include a position of the input unit AP, an inclination of the input unit AP, and state information of the input unit AP. When the input unit AP contacts the input sensor ISP, the sensor controller 100 may receive the downlink signal through the input sensor ISP.

The reception circuit 13*b* may receive an uplink signal from the sensor controller 100. The uplink signal may include information such as panel information, protocol version, and the like. The sensor controller 100 may supply the uplink signal to the input sensor ISP, and the input unit AP may receive the uplink signal through the contact with the input sensor ISP.

The input unit AP further includes an input controller 14 that controls driving of the input unit AP. The input controller 14 may operate according to a prescribed program. The transmission circuit 13*a* receives a signal supplied from the input controller 14 to modulate the received signal into a signal that is capable of being sensed by the input sensor ISP, and the reception circuit 13*b* receives a signal received through the input sensor ISP to modulate the received signal into a signal that is capable of being processed by the input controller 14. The input unit AP may further include a power module 15 for supplying power to the input unit AP.

Figure 4:
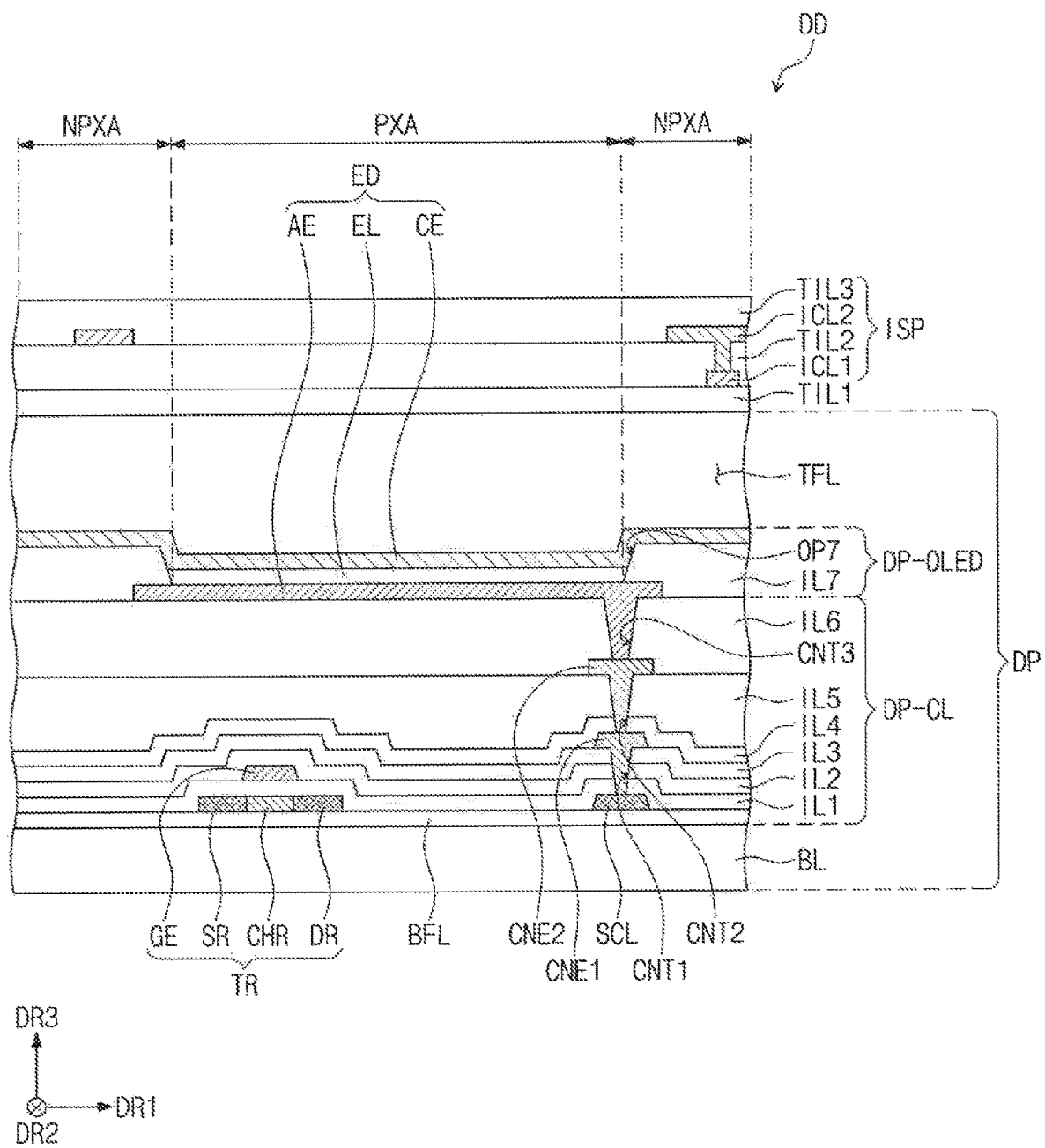
FIG. 4 is a cross-sectional view of the display device according to an embodiment of the inventive concept.

FIG. 4 is an enlarged cross-sectional view of the display device DD according to an embodiment of the inventive concept. FIG. 4 mainly illustrates the display device DD of FIG. 2D.

Referring to FIG. 4, the display device DD may include a display panel DP and an input sensor ISP disposed on the display panel DP. In an embodiment, the input sensor ISP is directly disposed on the display panel DP. The display panel DP may include a base layer BL, a circuit element layer DP-CL, a display element layer DP-OLED, and an upper insulating layer TFL.

The base layer BL may provide a base surface on which the circuit element layer DP-CL is disposed. The circuit element layer DP-CL may be disposed on the base layer BL. The circuit element layer DP-CL may include an insulating layer, a semiconductor pattern, a conductive pattern, and a signal line. The insulating layer, the semiconductor layer, and the conductive layer may be formed on the base layer BL in a manner such as coating or vapor deposition, and then, the insulating layer, the semiconductor layer, and the conductive layer may be selectively patterned through a plurality of photolithography processes. Thereafter, the semiconductor pattern, the conductive pattern, and the signal line included in the circuit element layer DP-CL may be provided.

At least one inorganic layer may be disposed on a top surface of the base layer BL. The display panel DP is shown as including a buffer layer BFL. The buffer layer BFL may increase bonding force between the base layer BL and the semiconductor pattern. The buffer layer BFL may include a silicon oxide layer and a silicon nitride layer, and the silicon oxide layer and the silicon nitride layer may be alternately laminated.

The semiconductor pattern may be disposed on the buffer layer BFL. The semiconductor pattern may include polysilicon. However, the embodiment of the inventive concept is not limited thereto. For example, the semiconductor pattern may include amorphous silicon or metal oxide.

FIG. 4 illustrates merely a portion of the semiconductor pattern. For example, the semiconductor pattern may be further disposed on other areas. The semiconductor pattern may be arranged in a specific rule over pixels. The semiconductor pattern has different electrical properties depending on whether the semiconductor pattern is doped. The semiconductor pattern may include a first region having high conductivity and a second region having low conductivity. The first region may be doped with an N-type dopant or a P-type dopant. A P-type transistor includes a doped region into which the P-type dopant is doped. The second region may be a non-doped area (i.e., an intrinsic semiconductor region) or may be doped at a concentration less than that of the first region.

The first area may have conductivity greater than that of the second area and may serve as an electrode or a signal line. The second region may correspond to an active region (or a channel region) of the transistor TR. For example, a portion of the semiconductor pattern may be an active region of the transistor, and the other portion may be a source region or a drain region of the transistor.

Each of the pixels may have an equivalent circuit including seven transistors, one capacitor, and a light emitting element, and an equivalent circuit diagram of the pixel may be modified in various forms. In FIG. 4, one transistor TR and light emitting element ED, which are included in the pixel, are exemplarily illustrated.

The source region SR, the channel region CHR, and the drain region DR of the transistor TR may be formed from the semiconductor pattern. The source region SR and the drain region DR may be provided in opposite directions from the channel region CHR on a cross section. FIG. 4 illustrates a portion of a signal line SCL provided as the first region of the semiconductor pattern. Although not shown separately, the signal line SCL may be electrically connected to the transistor TR.

The first insulating layer IL1 may be disposed on the buffer layer BFL. The first insulating layer IL1 commonly overlaps the plurality of pixels PX to cover the semiconductor pattern. The first insulating layer IL1 may include an inorganic layer and/or an organic layer, and may have a single-layered or multilayered structure. The first insulating layer IL1 may include at least one of aluminum oxide, titanium oxide, silicon oxide, silicon nitride, silicon oxynitride, zirconium oxide, and hafnium oxide. The first insulating layer IL1 may include a single-layered silicon oxide layer.

The insulating layer of the circuit element layer DP-CL, which will be described later, as well as the first insulating layer IL1 may be an inorganic layer and/or an organic layer and may have a single-layered or a multi-layered structure. The inorganic layer may include at least one of the above-described materials, but is not limited thereto.

A gate GE of the transistor TR is disposed on the first insulating layer ILL The gate GE may be a portion of a metal pattern. The gate GE overlaps the channel region CHR. In a process of doping the semiconductor pattern, the gate GE may function as a mask.

The second insulating layer IL2 may be disposed on the first insulating layer IL1 to cover the gate GE. The second insulating layer IL2 may commonly overlap the pixels. The second insulating layer IL2 may be an inorganic layer and/or an organic layer and have a single-layered or multilayered structure. The second insulating layer IL2 may be a single-layered silicon oxide layer.

The third insulating layer IL3 may be disposed on the second insulating layer IL2. The third insulating layer IL3 may be a single-layered silicon oxide layer. A first connection electrode CNE1 may be disposed on the third insulating layer IL3. The first connection electrode CNE1 may be connected to the signal line SCL through a contact part hole CNT1 passing through the first, second, and third insulating layers ILL IL2, and IL3.

The fourth insulating layer IL4 may be disposed on the third insulating layer IL3. The fourth insulating layer IL4 may be a single-layered silicon oxide layer. A fifth insulating layer IL5 may be disposed on the fourth insulating layer IL4. The fifth insulating layer IL5 may be an organic layer.

A second connection electrode CNE2 may be disposed on the fifth insulating layer IL5. The second connection electrode CNE2 may be connected to the first connection electrode CNE1 through a contact part hole CNT2 passing through the fourth insulating layer IL4 and the fifth insulating layer IL5.

A sixth insulating layer IL6 may be disposed on the fifth insulating layer IL5 to cover the second connection electrode CNE2. The sixth insulating layer IL6 may be an organic layer. The display element layer DP-OLED may be disposed on the circuit element layer DP-CL. The display element layer DP-OLED may include a light emitting element ED. The light emitting element ED may include a first electrode AE, an emission layer EL, and a second electrode CE. For example, the emission layer EL may include an organic light emitting material, quantum dots, quantum rods, a micro LED, or a nano LED.

The first electrode AE may be disposed on the sixth insulating layer IL6. The first electrode AE may be connected to the second connection electrode CNE2 through a contact part hole CNT3 passing through the sixth insulating layer IL6.

A pixel defining layer IL7 may be disposed on the sixth insulating layer IL6 to cover a portion of the first electrode AE. An opening OP7 is defined in the pixel defining layer IL7. The opening OP7 of the pixel defining layer IL7 exposes at least a portion of the first electrode AE. The emission area PXA may be defined to correspond to a portion of an area of the first electrode AE exposed by the opening OP7. The non-emission area NPXA may surround the emission area PXA.

The emission layer EL may be disposed on the first electrode AE. The emission layer EL may be disposed in the opening OP7. For example, the emission layer EL may be disposed to be separated from each of the pixels. When the emission layer EL is disposed to be separated from each of the pixels, each of the emission layers EL may emit light having at least one of a blue color, a red color, and a green color. However, the embodiment of the inventive concept is not limited thereto. For example, the emission layer EL may be commonly provided to be connected to the pixels. The emission layer EL may provide a blue light or a white light.

The second electrode CE may be disposed on the emission layer EL. The second electrode CE may have an integrated shape and commonly disposed on the plurality of pixels. A common voltage may be provided to the second electrode CE, and the second electrode CE may be referred to as a common electrode.

Although not illustrated, a hole control layer may be disposed between the first electrode AE and the emission layer EL. A hole control layer may be commonly disposed on the emission area PXA and the non-emission area NPXA. The hole control layer may include a hole transport layer and may further include a hole injection layer. An electron control layer may be disposed between the emission layer EL and the second electrode CE. The electron control layer may include an electron transport layer and may further include an electron injection layer. The hole control layer and the electron control layer may be commonly formed in the pixels by using an open mask.

The input sensor ISP may be directly disposed on a top surface of the upper insulating layer TFL in a continuous process. In an embodiment, the input sensor ISP is directly disposed on a top surface of the upper insulating layer TFL in a continuous process. The input sensor ISP may include a first sensor insulating layer TILL a first conductive layer ICL1, a second sensor insulating layer TIL2, a second conductive layer ICL2, and a third sensor insulating layer TIL3. In an embodiment of the inventive concept, the first sensor insulating layer TIL1 may be omitted.

Each of the first conductive layer ICL1 and the second conductive layer ICL2 may include a plurality of patterns having a single-layered structure or a multilayered structure in which a plurality of layers are laminated in the third directional axis DR3. The conductive layer having the single-layered structure may include a metal layer or a transparent conductive layer.

The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), and the like. The transparent conductive layer may include conductive polymers such as PEDOT, metal nanowires, graphene, and the like.

The conductive layer having the multilayered structure may include metal layers. The metal layers may have a three-layered structure of titanium/aluminum/titanium. The conductive layer having the multilayered structure may include at least one metal layer and at least one transparent conductive layer.

The arrangement relationship between the first conductive layer ICL1 and the second conductive layer ICL2, which is illustrated in FIG. 4, is illustrated as an example, and embodiments with respect to the first conductive layer ICL1 and the second conductive layer ICL2 applied to the inventive concept will be described later.

The second sensor insulating layer TIL2 covers the first conductive layer ICL1, and the third sensor insulating layer TIL3 covers the second conductive layer ICL2. The first sensor insulating layer TIL1 to the third sensor insulating layer TIL3 are illustrated as a single layer, but are not limited thereto.

The third insulating layer IL3 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 5A:
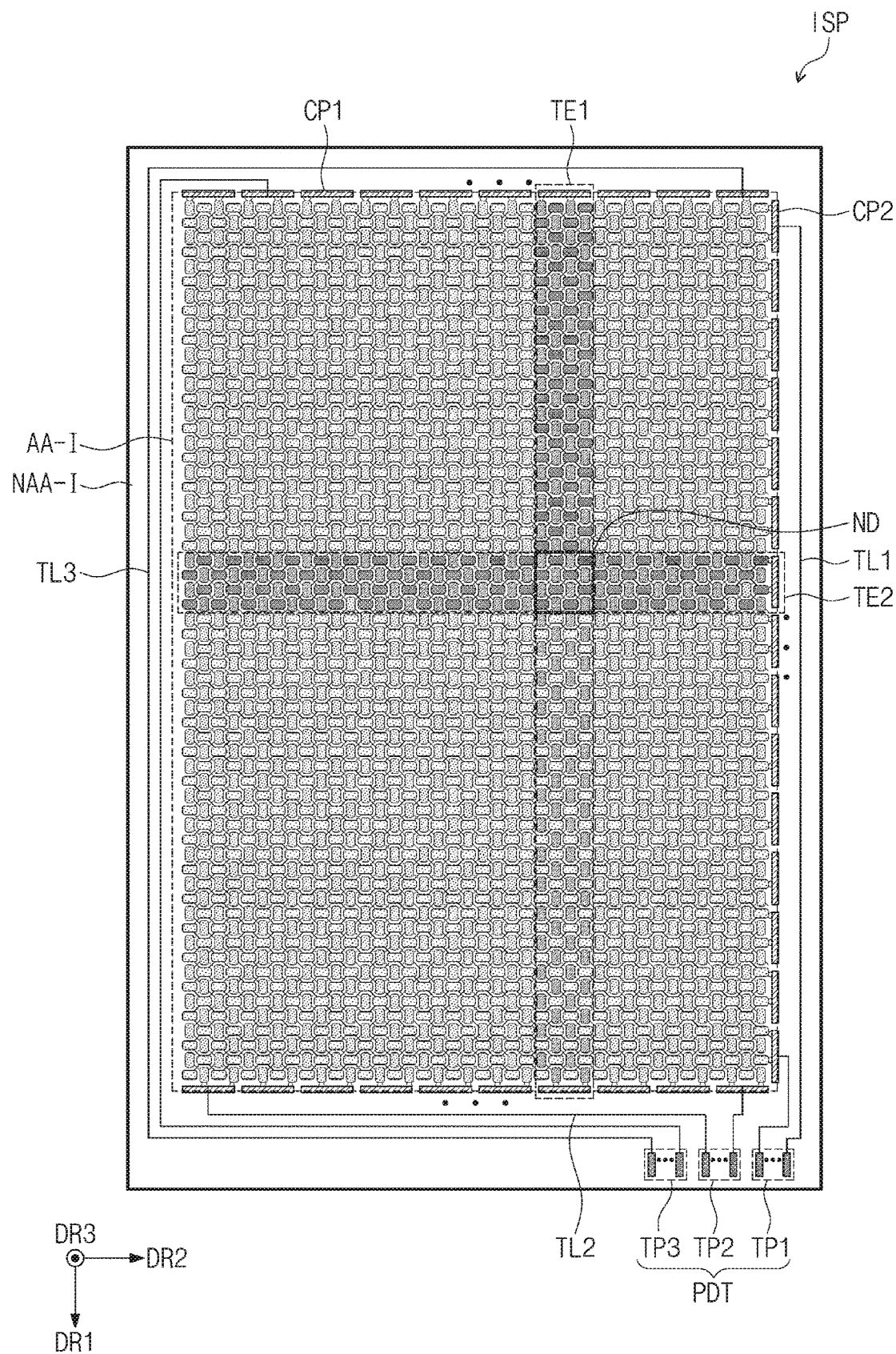
FIG. 5A is a plan view of an input sensor according to an embodiment of the inventive concept.
Figure 5B:
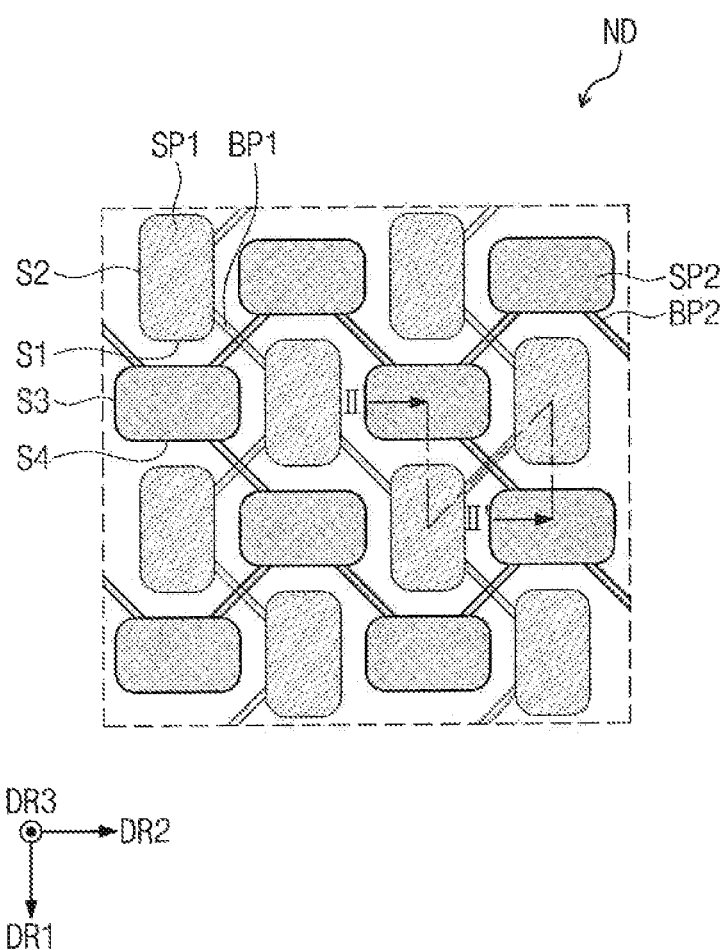
FIG. 5B is a plan view illustrating one node of the input sensor according to an embodiment of the inventive concept.

FIG. 5A is a plan view of the input sensor according to an embodiment of the inventive concept. FIG. 5B is a plan view illustrating one node of the input sensor according to an embodiment of the inventive concept.

Referring to FIGS. 5A and 5B, the input sensor ISP may be divided into a sensing area AA-I and a non-sensing area NAA-I. The sensing area AA-I and the non-sensing area NAA-I may correspond to the active area AA and the peripheral area NAA of the display device DD illustrated in FIG. 1B, respectively.

The input sensor ISP may include a plurality of electrodes TE1 and TE2, a plurality of sensing lines TL1, TL2 and TL3, and a plurality of sensing pads PDT. The plurality of electrodes TE1 and TE2 may include a first electrode TE1 and a second electrode TE2. The first electrode TE1 and the second electrode TE2 may be insulated from and cross each other.

Each of the first electrodes TE1 may extend in the first direction DR1, and the first electrodes TE1 may be arranged in the second direction DR2. For example, the first electrodes TE1 may be spaced apart from each other in the second direction DR2. The first electrode TE1 may include first patterns SP1, first bridge patterns BP1, and first connection patterns CP1. The first patterns SP1 may be arranged in a zigzag shape to extend along the first direction DR1.

Two first patterns SP1 of the first patterns SP1 may be connected to the first connection pattern CP1, and two first patterns SP1 spaced apart from each other in the first direction DR1 may be disposed to be shifted in the second direction DR2 from the two first patterns SP1 connected to the first connection pattern CP1. For example, two uppermost first patterns SP1 of the first patterns SP1 in each first electrode TE1 may be connected to a corresponding first connection pattern CP1, and two first patterns SP1, adjacent to the two uppermost first patterns SP, in each first electrode TE1 may be spaced apart therefrom in the first direction DR1, and may be shifted in the second direction DR2 from the two uppermost first patterns SP1 connected to the first connection pattern CP1. Such arrangement relationship of the first patterns SP1 in each first electrode TE1 may be repeated, and the first patterns SP1 may be arranged in a zigzag shape in two columns.

The first bridge patterns BP1 may connect the first patterns SP1 spaced apart from each other to each other. For example, the first patterns SP1 arranged to be spaced apart from each other in a diagonal direction between the first direction DR1 and the second direction DR2 may be connected to each other by the first bridge patterns BP1. The first bridge patterns BP1 may extend in the diagonal direction between the first direction DR1 and the second direction DR2 to connect the first patterns SP1 to each other. The first bridge patterns BP1 may extend from an edge of the other first pattern to an edge of one first pattern. For example, each first bridge pattern BP1 may connect a corresponding pair of two first patterns SP1 with each other. The two first patterns SP1 may be spaced apart from each other in the diagonal direction.

Each of the first connection patterns CP1 may be connected to the first patterns SP1 that are closest to the peripheral area NAA-I among the first patterns SP1 included in the first electrode TE1 The second sensing lines TL2 and the third sensing lines TL3 may be connected to the corresponding first connection patterns CP1 to be connected to the first patterns SP1, respectively.

Each of the second electrodes TE2 may extend in the second direction DR2, and the second electrodes TE2 may be arranged in the first direction DR1. For example, the second electrodes TE2 may be spaced apart from each other in the first direction DR1. The second electrode TE2 may include second patterns SP2, second bridge patterns BP2, and second connection patterns CP2. The second patterns may be arranged in a zigzag shape to extend in the second direction DR2.

Two second patterns SP2 of the second patterns SP2 may be connected to the second connection pattern CP2, and two second patterns SP2 spaced apart from each other in the second direction DR2 may be disposed to be shifted in the first direction DR1 from the two second patterns SP2 connected to the second connection patterns CP2. For example, the rightmost two second patterns SP2 of the second patterns SP2 in each second electrode TE2 may be connected to a corresponding second connection pattern CP2, and two second patterns SP2, adjacent to the rightmost two second patterns SP2, in each second electrode TE2 may be spaced apart therefrom in the second direction DR2, and may be shifted in the first direction DR1 from the rightmost two second patterns SP2 connected to the second connection pattern CP2. The above arrangement relationship of the second patterns SP2 in each second electrode TE2 may be repeated, and the second patterns SP2 may be arranged in a zigzag shape in two rows.

The second bridge patterns BP2 may connect the second patterns SP2 spaced apart from each other to each other. For example, the second patterns SP2 arranged to be spaced apart from each other along the diagonal direction between the first direction DR1 and the second direction DR2 may be connected to each other by the second bridge patterns BP2. The second bridge patterns BP1 may extend in the diagonal direction between the first direction DR1 and the second direction DR2 to connect the second patterns SP2 to each other. The second bridge patterns BP2 may extend from an edge of one second pattern to an edge of the other second pattern. At least a portion of the second bridge patterns BP2 may cross the first bridge patterns BP1 on the plane. For example, when the input sensor ISP is viewed in a plan view (hereinafter referred to as "in the plan view"), at least a portion of the second bridge patterns BP2 may cross the first bridge patterns BP1. The first bridge patterns BP1 and the second bridge patterns BP2 may be insulated from each other where the first bridge patterns BP1 cross the second bridge patterns BP2.

Each of the second connection patterns CP2 may be connected to the second patterns SP2 that are closest to the peripheral area NAA-I among the second patterns SP2 included in the second electrode TE2. The first sensing lines TL1 may be connected to the corresponding second connection patterns CP2 to be connected to the second patterns SP2.

The sensing lines TL1, TL2, and TL3 are disposed on the peripheral area NAA-I. The sensing lines TL1, TL2, and TL3 may include a first sensing line TL1, a second sensing line TL2, and a third sensing line TL3.

The first sensing line TL1 may be connected to the second electrode TE2. The second sensing line TL2 may be connected to one end of the first electrode TE1 The third sensing line TL3 may be connected to the other end of the first electrode TE1 The other end of the second sensing electrode TE2 may be a portion opposite to one end of the second sensing electrode TE2.

The first electrode TE1 according to an embodiment of the inventive concept may be connected to the second sensing line TL2 and the third sensing line TL3. Thus, sensitivity on an area with respect to the second sensing electrode TE2, which has a length that is relatively longer than that of the first sensing electrode TE1, may be uniformly maintained. This is merely an example. The third sensing line TL3 according to an embodiment of the inventive concept may be omitted and is not limited to a specific embodiment.

The display pads PDT may be disposed on the peripheral area NAA-1. The sensing pads PDT may include a first sensing pad TP1, a second sensing pad TP2, and a third sensing pad TP3. The first sensing pad TP1 may be connected to the first sensing line TL1 to be electrically connected to the first electrode TE1 The second sensing pad TP2 may be connected to the second sensing line TL2. The third sensing pad TP3 may be connected to the third sensing line TL3. Therefore, the second sensing pad TP2 and the third sensing pad TP3 are electrically connected to the second electrode TE2.

In the embodiment of the inventive concept, an area on which the first electrode TE1 and the second electrode TE2 cross each other is defined as a node ND (i.e., a node region). FIG. 5B shows the node ND at which the first electrode TE1 and the second electrode TE2 cross each other. In FIG. 5B, the second patterns SP2 of the second electrode TE2 are shown using thick lines, and the first patterns SP1 and the second patterns SP2 are differently hatched.

One node ND may include the same number of first patterns SP1 and second patterns SP2. For example, eight first patterns SP1 and eight second patterns SP2 may be disposed on the node ND. The first patterns SP1 and the second patterns SP2 may be alternately disposed in the first direction DR1 and the second direction DR2.

The first patterns SP1 may have a rectangular shape. In an embodiment, the rectangular shape has round corners. Each of the first patterns SP1 may include a first side S1 and a second side S2. The first side S1 may extend in the second direction DR2, and the second side S2 may extend from the first side S1 in the first direction DR1. The first side S1 may have a length less than that of the second side S2.

The second patterns SP2 may have a rectangular shape. In an embodiment, the rectangular shape has rounded corners. Each of the second patterns SP2 may include a third side S3 and a fourth side S4. The third side S3 may extend in the first direction DR1, and the fourth side S4 may extend from the third side S3 in the second direction DR2. The third side S3 may have a length less than that of the fourth side S4.

According to the embodiment of the inventive concept, the first side S1 of each of the first patterns SP1 may face the fourth side S4 of each of the second patterns SP2 in the first direction DR1. The second side S2 of each of the first patterns SP1 may face the third side S3 of each of the second patterns SP2 in the second direction DR2. Therefore, edges of the first patterns SP1 spaced apart from each other in the first direction DR1 and the second direction DR2 face each other, and edges of the second patterns SP2 spaced apart from each other in the first direction DR1 and the second DR2 may face each other. In an embodiment, the first patterns SP1 and the second patterns SP2 have the same area as each other. The present invention is not limited thereto. For example, the first patterns SP1 and the second patterns SP2 may be different from each other in an area size—the area size of each of the first patterns SP1 is greater than that of each of the second patterns SP2, or vice versa. In an embodiment, the first patterns SP1 and the second patterns SP2 have the same shape, except for the shapes of the first patterns SP1 are rotated shapes of the second patterns SP2 by a predetermined angle having a value between 0° and 180°. In an embodiment, the predetermined angle is 90°.

According to the embodiment of the inventive concept, the patterns disposed in the node ND may be alternately disposed with each other to secure signal uniformity according to a position of an input applied to the input sensor. As the plurality of patterns are arranged in one node ND, not only a signal generated by the first input TC1 but also a signal generated by the second input TC2 may increase. Accordingly, the electronic apparatus ELD including the input sensor ISP with improved sensing sensitivity may be provided.

Figure 6:
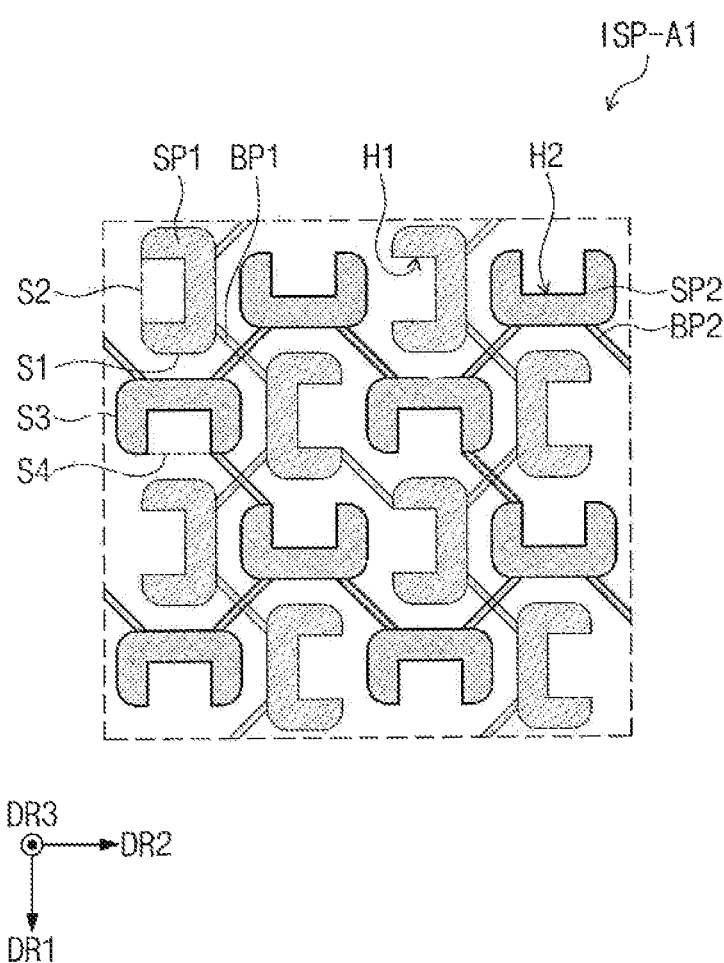
FIG. 6 is a plan view of patterns according to an embodiment of the inventive concept.
Figure 7:
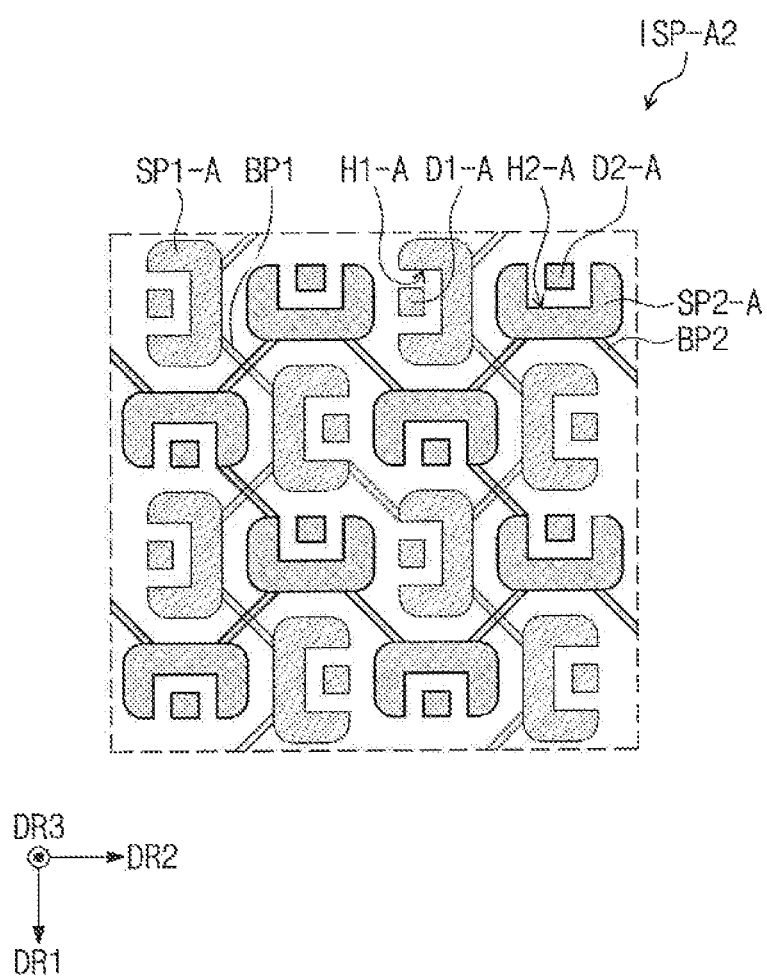
FIG. 7 is a plan view illustrating pattern of the input sensor according to an embodiment of the inventive concept.
Figure 8:
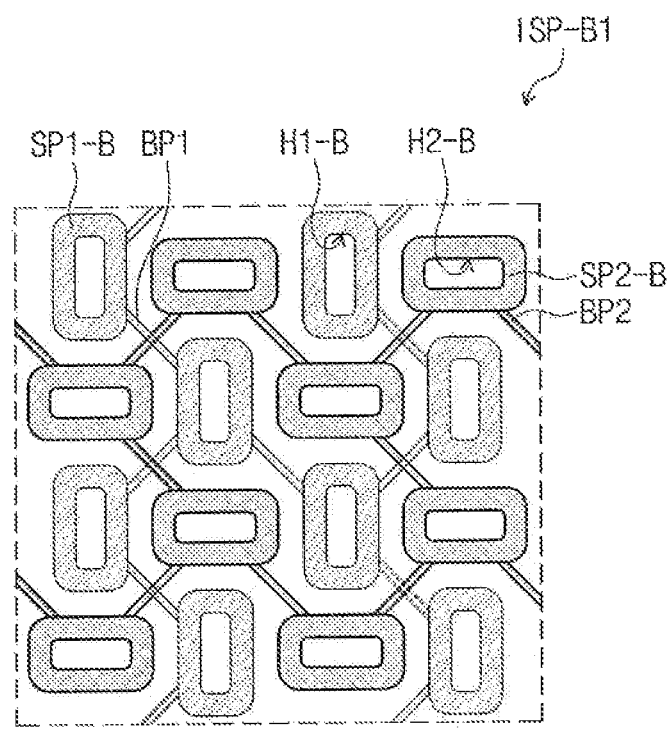
FIG. 8 is a plan view illustrating pattern of the input sensor according to an embodiment of the inventive concept.
Figure 8:
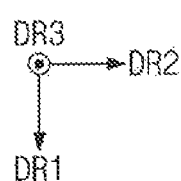
Figure 9:
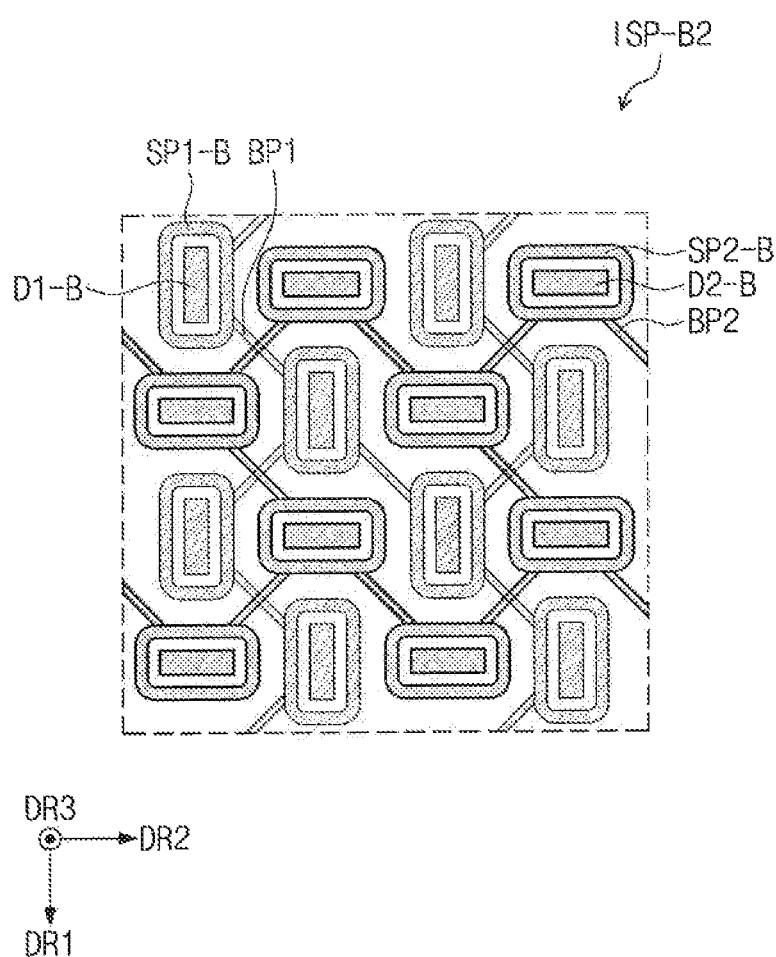
FIG. 9 is a plan view illustrating pattern of the input sensor according to an embodiment of the inventive concept.
Figure 10:
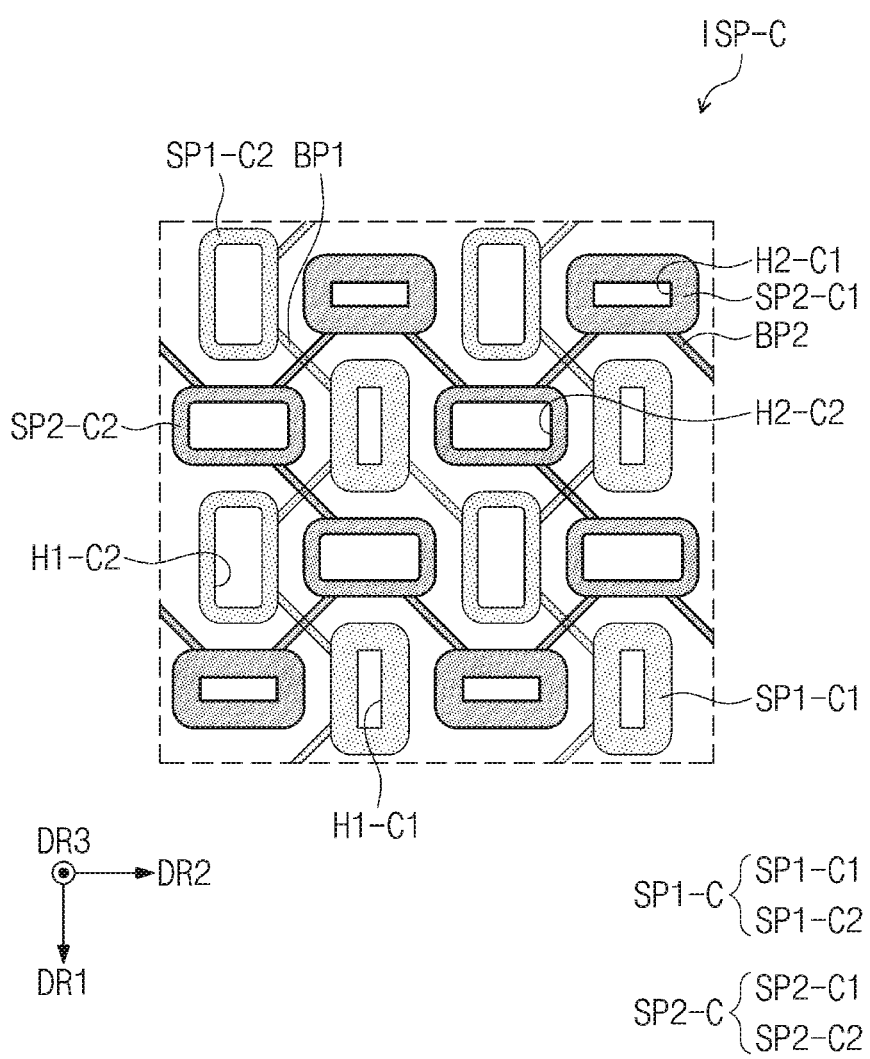
FIG. 10 is a plan view illustrating pattern of the input sensor according to an embodiment of the inventive concept.
Figure 11:
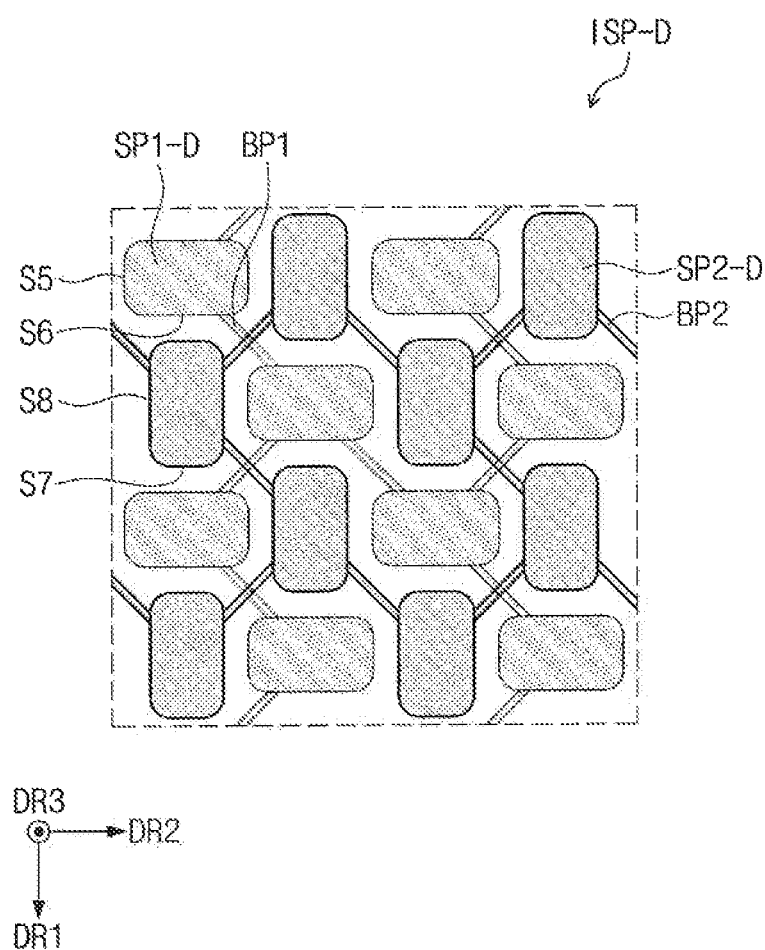
FIG. 11 is a plan view illustrating one node of the input sensor according to an embodiment of the inventive concept.

FIG. 6 is a plan view of patterns according to an embodiment of the inventive concept. FIG. 7 is a plan view illustrating pattern of the input sensor according to an embodiment of the inventive concept. FIG. 8 is a plan view illustrating pattern of the input sensor according to an embodiment of the inventive concept; FIG. 9 is a plan view illustrating pattern of the input sensor according to an embodiment of the inventive concept; FIG. 10 is a plan view illustrating pattern of the input sensor according to an embodiment of the inventive concept. FIG. 11 is a plan view illustrating one node of the input sensor according to an embodiment of the inventive concept.

FIGS. 6 to 11 illustrate embodiments showing an area corresponding to the node ND described in FIGS. 5A and 5B, and the sensing lines, the connection patterns, and the sensing pads of the constituents of the input sensor ISP described with reference to FIG. 5 will be omitted.

Referring to FIG. 6, an input sensor ISP-A1 according to an embodiment may include a first electrode TE1 (see FIG. 5A) and a second electrode TE2 (see FIG. 5A). The first electrode TE1 may include first patterns SP1 and first bridge patterns BP1. The second electrode TE2 may include second patterns SP2 and second bridge patterns BP2.

At least one of the first patterns SP1 and the second patterns SP2 may have pattern holes of which portions are removed in a direction from the outside to the inside of the patterns.

For example, the first pattern SP1 may have a first pattern hole H1 (i.e., a first recess) in which a portion of the first pattern SP1 is removed in a direction from the outside to the inside (i.e., recessed inwardly). For example, a portion of the second side S2 may be removed by the formation of the first pattern hole H1. The first pattern hole H1 may be defined by inner surfaces of the first pattern SP1 that are exposed by removing the portion of the first pattern SP1.

The second pattern SP2 may have a second pattern hole H2 (i.e., a second recess) in which a portion of the second pattern SP2 is removed in a direction from the outside to the inside (i.e., recessed inwardly). For example, a portion of the fourth side S4 may be removed by the formation of the second pattern hole H2. The second pattern hole H2 may be defined by inner surfaces of the second pattern SP2 that are exposed to the outside by removing portions of the second patterns SP2.

The first patterns SP1 disposed in a first row may have the first pattern holes H1 which are open to a left side, and the first patterns SP1 disposed in a second row, which are spaced apart from each other in the first direction DR1, may have the first pattern holes H1-A that is open to a right side. However, the embodiment of the inventive concept is not limited thereto. For example, the direction in which the first pattern holes H1-A are defined in each row may be the same or be defined randomly.

The second patterns SP2 disposed in the first row may have the second pattern holes H2 which are open to an upper side, and the second patterns SP2 disposed in the second row, which are spaced apart from each other in the first direction DR1, may have the second pattern hole H2 that is open to a downward side. However, the embodiment of the inventive concept is not limited thereto. For example, the direction in which the second pattern holes H2 are defined in each row may be the same or be defined randomly.

According to the embodiment of the inventive concept, the patterns SP1 and SP2 included in the electrodes TE1 and TE2 may have the pattern holes H1 and H2 that are partially removed, and thus, parasitic capacitance between adjacent patterns, to which different signals are applied, may be reduced. In an embodiment, the first patterns SP1 and the second patterns SP2 have the same area as each other. The present invention is not limited thereto. For example, the first patterns SP1 and the second patterns SP2 may be different from each other in an area size—the area size of each of the first patterns SP1 is greater than that of each of the second patterns SP2, or vice versa. In an embodiment, the first patterns SP1 and the second patterns SP2 have the same shape, except for the shapes of the first patterns SP1 are rotated shapes of the second patterns SP2 by a predetermined angle having a value between 0° and 180°, clockwise or counter-clockwise. In an embodiment, the predetermined angle is 90°.

Referring to FIG. 7, an input sensor ISP-A2 according to an embodiment may include a first electrode TE1 (see FIG. 5A) and a second electrode TE2 (see FIG. 5A). The first electrode TE1 may include first patterns SP1-A and first bridge patterns BP1. The second electrode TE2 may include second patterns SP2-A and second bridge patterns BP2.

At least one of the first patterns SP1-A and the second patterns SP2-A may have pattern holes of which portions are removed in a direction from the outside to the inside of the patterns.

For example, the first pattern SP1-A may have a first pattern hole H1-A (i.e., a first recess) in which a portion of the first patterns SP1-A is removed in a direction from the outside to the inside (i.e., recessed inwardly). A portion of the second side S2 of the first pattern SP1-A may be removed by the formation of the first pattern hole H1-A. The first pattern hole H1-A may be defined by the inner surfaces of the first pattern SP1-A, which are exposed by removing portions of the first pattern SP1-A.

The second pattern SP2-A may have a second pattern hole H2-A (i.e., a second recess) in which a portion of the second patterns SP2-A is removed in a direction from the outside to the inside (i.e., recessed inwardly). For example, a portion of the fourth side S4 of the second pattern SP2-A may be removed by the formation of the second pattern hole H2-A. The second pattern hole H2-A may be defined by the inner surfaces of the second pattern SP2-1, which are exposed by removing portions of the second pattern SP2-A to the outside.

The input sensor ISP-A2 may further include dummy patterns D1-A and D2-A. The first dummy pattern D1-A may be disposed in the first pattern hole H1-A and be electrically insulated by being spaced apart from the first pattern SP1-A. A portion of the first dummy pattern D1-A may be surrounded by the inner surfaces of the first pattern SP1-A defining the first pattern hole H1-A.

The second dummy pattern D2-A may be disposed in the second pattern hole H2-A and be electrically insulated by being spaced apart from the second pattern SP2-A. A portion of the second dummy pattern D2-A may be surrounded by the inner surfaces of the second pattern SP2-A defining the second pattern hole H2-A.

The dummy patterns D1-A and D2-A may be disposed in the removed pattern holes H1-A and H2-A. The dummy patterns D1-A and D2-A may be spaced apart from the inner surfaces of the patterns SP1-A and SP2-A to be insulated therefrom to prevent the shapes of the patterns SP1-A and SP2-A from being visually recognized by the user. For the convenience of description, the dummy patterns D1-A and D2-A are described as separate elements from the patterns SP1-A and SP2-A. However, the first dummy pattern D1-A may be part of the first pattern SP1-A, and the second dummy pattern D2-A may be part of the second pattern SP2-A. In an embodiment, the first patterns SP1-A and the second patterns SP2-A have the same area as each other. The present invention is not limited thereto. For example, the first patterns SP1-A and the second patterns SP2-A may be different from each other in an area size—the area size of each of the first patterns SP1-A is greater than that of each of the second patterns SP2-A, or vice versa. In an embodiment, the first patterns SP1-A and the second patterns SP2-A have the same shape, except for the shapes of the first patterns SP1-A are rotated shapes of the second patterns SP2-A by a predetermined angle having a value between 0° and 180°. In an embodiment, the predetermined angle is 90°.

Referring to FIG. 8, an input sensor ISP-B1 according to an embodiment may include a first electrode TE1 (see FIG. 5A) and a second electrode TE2 (see FIG. 5A). The first electrode TE1 may include first patterns SP1-B and first bridge patterns BP1. The second electrode TE2 may include second patterns SP2-B and second bridge patterns BP2.

At least one of the first patterns SP1-B and the second patterns SP2-B may have a ring-shaped structure through which a pattern hole passes at the center of the ring-shaped structure.

For example, the first patterns SP1-B may have a ring-shaped structure through which a first pattern hole H1-B passes at the center of the ring-shaped structure. The first pattern hole H1-B may be defined by inner surfaces of the first pattern SP1-B, which are penetrated and exposed to the outside, among the first patterns SP1-B.

The second pattern SP2-B may have a ring-shaped structure through which a second pattern hole H2-B pass at the center of the ring-shaped structure. The second pattern hole H2-B may be defined by the inner surfaces of the second patterns SP2-B that are penetrated and exposed to the outside, among the second patterns SP2-B.

According to the embodiment of the inventive concept, the patterns SP1-B and SP2-B included in the electrodes TE1 and TE2 may have the pattern holes H1-B and H2-B that penetrate the patterns SP1-B and SP2-B, and thus, the parasitic capacitance between adjacent patterns, to which different signals are applied, may be reduced. In an embodiment, the first patterns SP1-B and the second patterns SP2-B have the same area as each other. The present invention is not limited thereto. For example, the first patterns SP1-B and the second patterns SP2-B may be different from each other in an area size—the area size of each of the first patterns SP1-B is greater than that of each of the second patterns SP2-B, or vice versa. In an embodiment, the first patterns SP1-B and the second patterns SP2-B have the same shape, except for the shapes of the first patterns SP1-B are rotated shapes of the second patterns SP2-B by a predetermined angle having a value between 0° and 180°. In an embodiment, the predetermined angle is 90°.

Referring to FIG. 9, an input sensor ISP-B2 according to an embodiment may include a first electrode TE1 (see FIG. 5A) and a second electrode TE2 (see FIG. 5A). The first electrode TE1 may include first patterns SP1-B and first bridge patterns BP1. The second electrode TE2 may include second patterns SP2-B and second bridge patterns BP2.

At least one of the first patterns SP1-B or the second patterns SP2-B may have a ring-shaped structure through which a pattern hole passes at the center of the ring-shaped structure.

For example, the first pattern SP1-B may have a ring-shaped structure through which a first pattern hole H1-B passes at the center of the ring-shaped structure. The first pattern hole H1-B may be defined by inner surfaces of the first pattern SP1-A, which are penetrated and exposed to the outside, among the first patterns SP1-B.

The second pattern SP2-B may have a ring-shaped structure through which a second pattern hole H2-B passes at the center of the ring-shaped structure. The second pattern hole H2-B may be defined by the inner surfaces of the second patterns SP2-B that are penetrated and exposed to the outside, among the second patterns SP2-B.

The input sensor ISP-B2 may further include dummy patterns D1-B and D2-B. The first dummy pattern D1-B may be disposed in the first pattern hole H1-B and be electrically insulated by being spaced apart from the first pattern SP1-B. The first dummy pattern D1-B may be surrounded by the inner surfaces of the first pattern SP1-B defining the first pattern hole H1-B.

The second dummy pattern D2-B may be disposed in the second pattern hole H2-B and be electrically insulated by being spaced apart from the second pattern SP2-B. The second dummy pattern D2-B may be disposed in the second pattern hole H2-B and be electrically insulated by being spaced apart from the second pattern SP2-B.

The patterns SP1-B and SP2-B may be disposed in the penetrated pattern holes H1-B and H2-B and have the dummy patterns D1-B, D2-B, which are spaced to be insulated from the patterns SP1-B and SP2-B to prevent the shapes of the patterns SP1-B and SP2-B from being visually recognized by the user. For the convenience of description, the dummy patterns D1-B and D2-B are described as separate elements from the patterns SP1-B and SP2-B. However, the dummy pattern D1-B may be part of the first pattern SP1-B, and the dummy pattern D2-B may be part of the second pattern SP2-B. In an embodiment, the first patterns SP1-B and the second patterns SP2-B have the same area as each other. The present invention is not limited thereto. For example, the first patterns SP1-B and the second patterns SP2-B may be different from each other in an area size—the area size of each of the first patterns SP1-B is greater than that of each of the second patterns SP2-B, or vice versa. In an embodiment, the first patterns SP1-B and the second patterns SP2-B have the same shape, except for the shapes of the first patterns SP1-B are rotated shapes of the second patterns SP2-B by a predetermined angle having a value between 0° and 180°. In an embodiment, the predetermined angle is 90°.

Referring to FIG. 10, an input sensor ISP-C according to an embodiment may include a first electrode TE1 (see FIG. 5A) and a second electrode TE2 (see FIG. 5A). The first electrode TE1 may include first patterns SP1-C and first bridge patterns BP1. The second electrode TE2 may include second patterns SP2-C and second bridge patterns BP2.

At least one of the first patterns SP1-C or the second patterns SP2-C may have a ring-shaped structure through which a pattern hole passes at the center of the ring-shaped structure.

The first patterns SP1-C may have first pattern holes H1-C1 and H1-C2 which pass through the first patterns SP1-C. For example, the first patterns SP1-C may have a first-type first pattern SP1-C1 having a ring-shaped structure through which a first pattern hole H1-C1 passes at the center of the ring-shaped structure, and a second-type first pattern SP1-C2 having a ring-shaped structure through which a first pattern hole H1-C2 passes at the center of the ring shaped structure. The first pattern holes H1-C1 and H1-C2 may be defined by inner surfaces of the first-type and second-type patterns SP1-C1 and SP1-C2, respectively, which are penetrated by the first pattern holes H1-C1 and H1-C2 and exposed to the outside, among the first patterns SP1-C1 and SP1-C2.

The first pattern holes H1-C1 and H1-C2 may include a first small pattern hole H1-C1 and a first large pattern hole H1-C2. The first small pattern hole H1-C1 may have an area less than that of the first large pattern hole H1-C2. Each of the second-type first patterns SP1-C2 disposed in the first row may have the first large pattern hole H1-C2, and each of the first-type first patterns SP1-C1 disposed in the second row, which are spaced apart from each other in the first row and the first direction DR1, may have the first small pattern hole H1-C1. The first row and the second row may be alternately disposed in the first direction DR1. In an embodiment, an area defined by an outer boundary of the first-type first pattern SP1-C1 is the same as that defined by an outer boundary of the second-type first pattern SP1-C2, but an area defined by the outer boundary of the first-type first pattern SP1-C1 and an inner boundary thereof is greater than that defined by the outer boundary of the second-type first pattern SP1-C2 and an inner boundary thereof. The first-type first patterns SP1-C1 may be arranged in a first column extending in the first direction DR1, and the second-type first patterns SP1-C2 may be arranged in a second column extending in the first direction DR1. The first column of the first-type first patterns SP1-C1 and the second column of the second-type first patterns SP1-C2 may be alternately arranged in the second direction DR2.

However, the embodiment of the present invention is not limited thereto. For example, three or more pattern holes having different areas may be defined, and the pattern holes having the different areas may be randomly disposed.

The second patterns SP2-C may have second pattern holes H2-C1 and H2-C2 which pass through the second patterns SP2-C. For example, the second patterns SP2-C may have a first-type second pattern SP2-C1 having a ring-shaped structure through which a second pattern hole H2-C1 passes at the center of the ring-shaped structure, and a second-type second pattern SP2-C2 having a ring-shaped structure through which a second pattern hole H2-C2 passes at the center of the ring shaped structure. The second pattern holes H2-C1 and H2-C2 may be defined by the inner surfaces of the second patterns SP2-C1 and SP2-C2, respectively, that are penetrated and exposed to the outside, among the second patterns SP2-C1 and SP2-C2.

The second pattern holes H2-C1 and H2-C2 may include a first small pattern hole H2-C1 and a first large pattern hole H2-C2. The first small pattern hole H2-C1 may have an area less than that of the first large pattern hole H2-C2. Each of the first-type second patterns SP2-C1 disposed in the first and fourth rows may have the first small pattern hole H2-C1, and each of the second-type second patterns SP2-C2 disposed in the second and third rows, which are disposed between the first and fourth rows and spaced apart from each other in the first direction DR1, may have the first large pattern hole H2-C2. The first to fourth rows may be repeatedly disposed in the first direction DR1. In an embodiment, an area defined by an outer boundary of the first-type second pattern SP2-C1 is the same as that defined by an outer boundary of the second-type second pattern SP2-C2, but an area defined by the outer boundary of the first-type second pattern SP2-C1 and an inner boundary thereof is smaller than that defined by the outer boundary of the second-type second pattern SP2-C2 and an inner boundary thereof. The first-type second patterns SP2-C1 and the second-type second patterns SP2-C2 may be alternately arranged in first and second columns extending in the first direction DR1 with different sequence of the second patterns SP2-C1 and SP2-C2. The first and second columns may be alternately arranged in the second direction DR2. In an embodiment, the first-type first pattern SP1-C1 and the first-type second patterns SP2-C1 have the same area as each other, and the second-type first pattern SP1-C2 and the second-type second patterns SP2-C2 have the same area as each other. The present invention is not limited thereto. For example, the first-type first pattern SP1-C1 and the first-type second pattern SP2-C1 may be different from each other in an area size—the area size of the first-type first pattern SP1-C1 is greater than that of the first-type second pattern SP2-C1, or vice versa, and the second-type first pattern SP1-C2 and the second-type second pattern SP2-C2 may be different from each other in an area size—the area size of the second-type first pattern SP1-C2 is greater than that of the second-type second pattern SP2-C2, or vice versa. In an embodiment, the first-type first pattern SP1-C1 and the first-type second pattern SP2-C1 have the same shape, except for the shape of the first-type first pattern SP1-C1 is a rotated shape of the first-type second pattern SP2-C1 by a predetermined angle having a value between 0° and 180°. In an embodiment, the predetermined angle is 90°. In an embodiment, the second-type first pattern SP1-C2 and the second-type second pattern SP2-C2 have the same shape, except for the shape of the second-type first pattern SP1-C2 is a rotated shape of the second-type second pattern SP2-C2 by a predetermined angle having a value between 0° and 180°. In an embodiment, the predetermined angle is 90°.

However, the embodiment of the present invention is not limited thereto. For example, three or more pattern holes having different areas may be defined, and the pattern holes having the different areas may be randomly disposed.

Referring to FIG. 11, an input sensor ISP-D according to an embodiment may include a first electrode TE1 (see FIG. 5A) and a second electrode TE2 (see FIG. 5A). The first electrode TE1 may include first patterns SP1-D and first bridge patterns BP1. The second electrode TE2 may include second patterns SP2-D and second bridge patterns BP2.

The first patterns SP1-D may have a rectangular shape. In an embodiment, the rectangular shape has round corners. Each of the first patterns SP1-D may include a fifth side S5 and a sixth side S6. The fifth side S5 may extend in the first direction DR1, and the sixth side S6 may extend from the fifth side S5 in the second direction DR2. The fifth side S5 may have a length less than the length of the sixth side S6.

The second patterns SP2-D may have a rectangular shape. In an embodiment, the rectangular shape has round corners.

Each of the second patterns SP2-2 may include a seventh side S and an eighth side S8. The seventh side S7 may extend in the second direction DR2, and the eighth side S8 may extend from the seventh side S7 in the first direction DR1. The seventh side S7 may have a length less than the length of the eighth side S8.

In FIG. 6, a long axis of the input sensor ISP-A1 extends in the first direction DR1, and a short axis of the input sensor ISP-A1 extends in the second direction DR2. In the first patterns SP1 included in the first electrode TE1 of the input sensor ISP, the second side S2 extending in the first direction DR1 may also be greater than the first side S1 extending in the second direction DR2. However, in FIG. 11, the first patterns SP1-D may have the fifth side S5 extending in the first direction DR1 which is less than the sixth side S6 extending in the second direction DR2.

Figure 12:
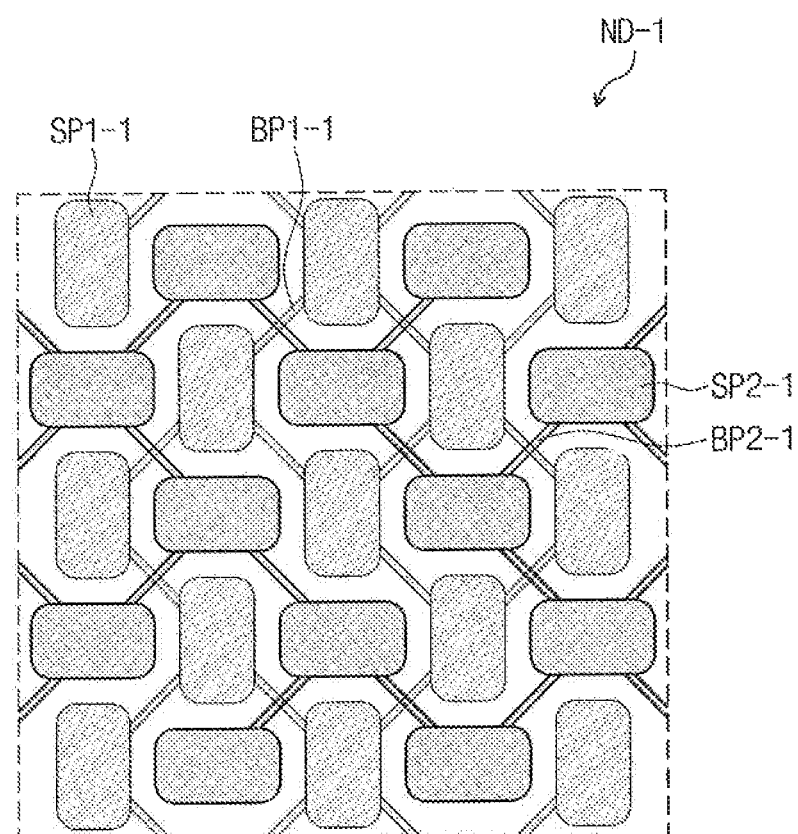
FIG. 12 is a plan view illustrating one node of the input sensor according to an embodiment of the inventive concept.
Figure 12:
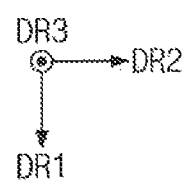
Figure 13:
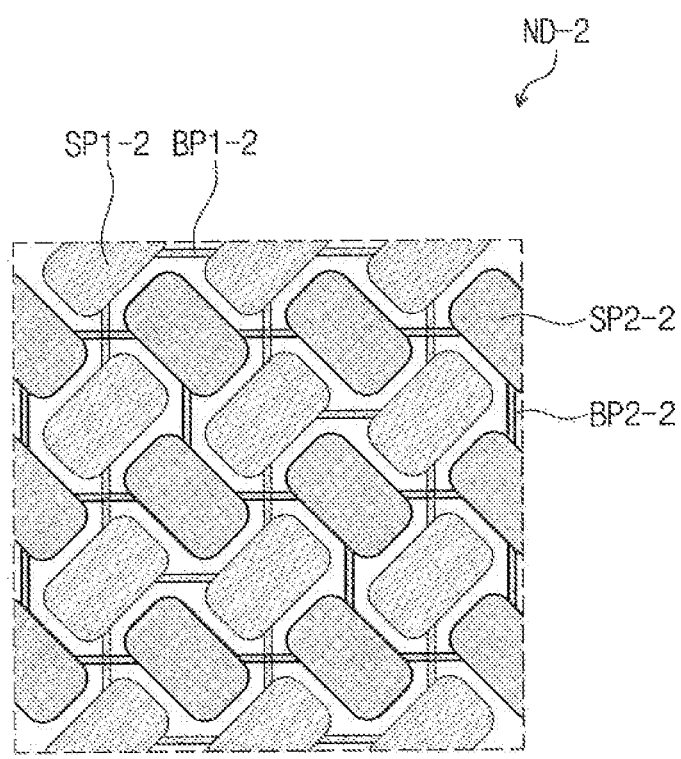
FIG. 13 is a plan view illustrating one node of the input sensor according to an embodiment of the inventive concept.
Figure 14:
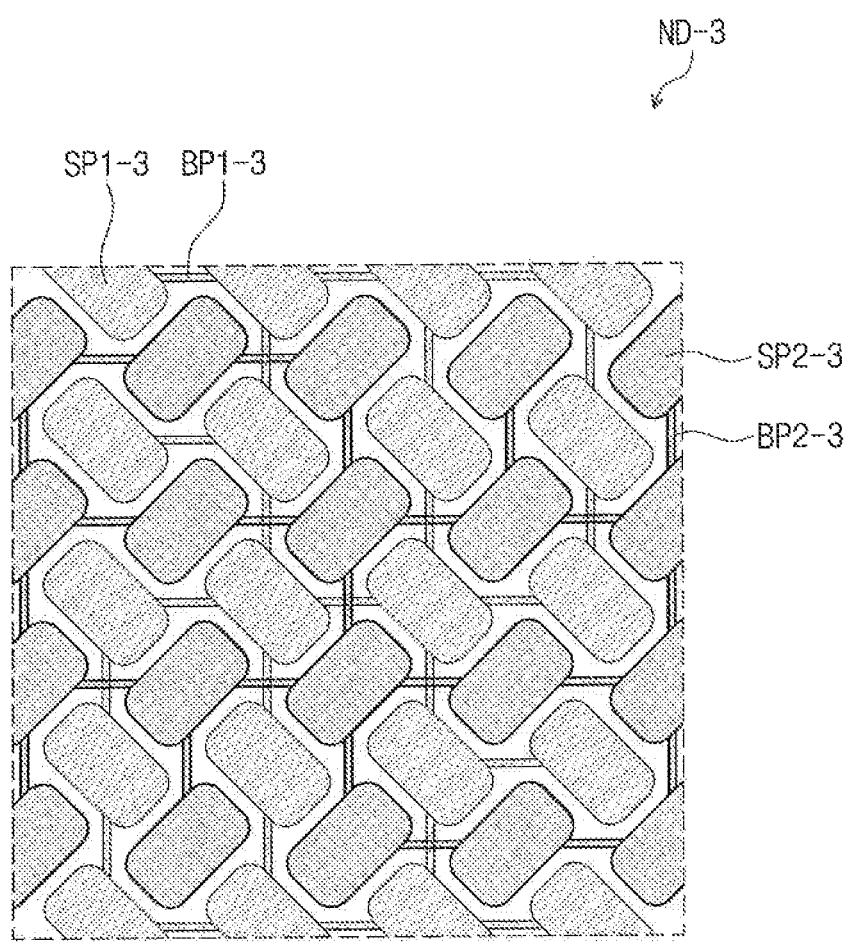
FIG. 14 is a plan view illustrating one node of the input sensor according to an embodiment of the inventive concept.

FIG. 12 is a plan view illustrating one node of the input sensor according to an embodiment of the inventive concept. FIG. 13 is a plan view illustrating one node of the input sensor according to an embodiment of the inventive concept. FIG. 14 is a plan view illustrating one node of the input sensor according to an embodiment of the inventive concept.

Referring to FIG. 12, in a node ND-1 according to an embodiment, first patterns SP1-1 and second patterns SP2-1 may be disposed in different numbers. For example, 13 first patterns SP1-1 and 12 second patterns SP2-1 may be disposed in the node ND-1. The first patterns SP1-1 and the second patterns SP2-1 may be alternately disposed along the first direction DR1 and the second direction DR2.

Referring to FIG. 13, in a node ND-2, first patterns SP1-2 and second patterns SP2-2 may be disposed in the same number. For example, 9 first patterns SP1-2 and 9 second patterns SP2-2 may be disposed in the node ND-2. The first patterns SP1-2 and the second patterns SP2-2 may be alternately disposed in the first direction DR1 and the second direction DR2.

Each of the first patterns SP1-2 and the second patterns SP2-2 may have a shape that rotates by about 45 degrees from the patterns SP1 and SP2 described in FIG. 5B. Sides of the first patterns SP1-2, which respectively correspond to the first sides S1 and the second sides S2 included in the first patterns SP1 described in FIG. 5B, may extend in the diagonal direction between the first direction DR1 and the second direction DR2. Sides of the first patterns SP2-2, which respectively correspond to the third sides S3 and the fourth sides S4 included in the second patterns SP2 described in FIG. 5B, may extend in the diagonal direction between the first direction DR1 and the second direction DR2.

Some of the first patterns SP1-2 and the second patterns SP2-2, which are calculated as the number of patterns SP1-2 and SP2-2 included in the node ND-2 may be spaced apart from a dotted inner area defining the node ND-2. The number of certain patterns SP1-2 and SP2-2 partially overlapping each other may be calculated as the number by adding the other patterns SP1-2 and SP2-2 facing each other. For example, the first patterns SP1-2 arranged in the first row are counted as one pattern by adding the first patterns SP1-2 arranged in a fourth row, which are spaced apart from each other in the first direction DR1.

Referring to FIG. 14, in a node ND-3, first patterns SP1-3 and second patterns SP2-3 may be disposed in the same number. For example, 16 first patterns SP1-3 and 16 second patterns SP2-3 may be disposed in the node ND-3. The first patterns SP1-3 and the second patterns SP2-3 may be alternately disposed in the first direction DR1 and the second direction DR2.

Each of the first patterns SP1-3 and the second patterns SP2-3 may have a shape that rotates by about 45 degrees from the patterns SP1 and SP2 described in FIG. 5B. Sides of the first patterns SP1-3, which respectively correspond to the first sides S1 and the second sides S2 included in the first patterns SP1 described in FIG. 5B, may extend in the diagonal direction between the first direction DR1 and the second direction DR2. Sides of the first patterns SP2-3, which respectively correspond to the third sides S3 and the fourth sides S4 included in the second patterns SP2 described in FIG. 5B, may extend in the diagonal direction between the first direction DR1 and the second direction DR2.

Figure 15:
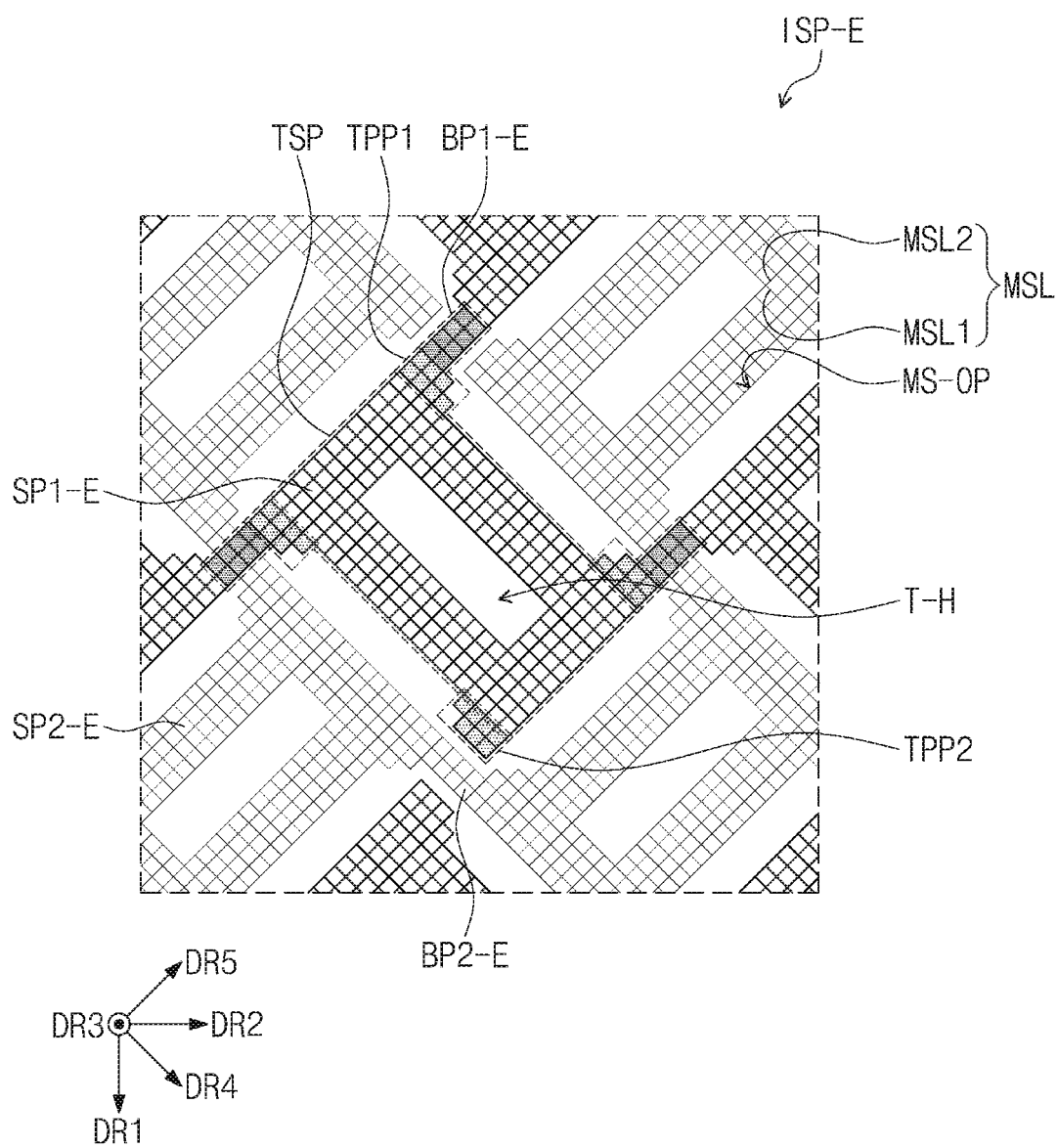
FIG. 15 is a plan view illustrating pattern of the input sensor according to an embodiment of the inventive concept.

FIG. 15 is a plan view illustrating pattern of the input sensor according to an embodiment of the inventive concept. The same/similar reference numerals are used for the same components as those of FIGS. 5A and 5B, and thus, their duplicated descriptions will be omitted.

Referring to FIG. 15, an input sensor ISP-E according to an embodiment may include a first electrode TE1 (see FIG. 5A) and a second electrode TE2 (see FIG. 5A). The first electrode TE1 may include first patterns SP1-E and first bridge patterns BP1-E. The second electrode TE2 may include second patterns SP2-E and second bridge patterns BP2-E.

The input sensor ISP-E may include a plurality of mesh lines MSL. The mesh lines MSL may include a first mesh line MSL1 extending in a fourth direction DR4 and a second mesh line MSL2 extending in a fifth direction DR5. The mesh lines MSL may be provided in the form of a lattice pattern to provide mesh openings MS-OP. The mesh lines MSL may overlap the non-emission area NPXA described in FIG. 4, and the mesh openings MS-OP may overlap the emission area PXA. Thus, even if the input sensor ISP-E directly disposed on the display panel DP is provided, an image may be provided without being affected by the patterns included in the input sensor ISP-E.

Each of the first patterns SP1-E and the second patterns SP2-E may include a body TSP, and protrusions TPP1 and TPP2. In FIG. 15, for convenience of explanation, the body TSP, and the protrusions TPP1 and TPP2 included in the first patterns SP1-E are described as examples, but the embodiment of the inventive concept is not limited thereto. For example, the body TSP and the protrusions TPP1 and TPP2 may also be applied to the second patterns SP2-E.

The body TSP may correspond to the pattern SP1 of FIG. 5B. In an embodiment, the body TSP may have a body hole T-H defined therein. The body hole T-H may be defined as the mesh lines MSL that are exposed by passing through the body TSP.

The protrusions TPP1 and TPP2 may protrude from an edge of the body TPP. The protrusions TPP1 and TPP2 may include a first protrusion TPP1 and a second protrusion TPP2 extending from the body TPP and spaced apart from each other.

The first protrusion TPP1 may be connected to the first bridge pattern BP1-E. The second protrusion TTP2 may be spaced apart from the first bridge pattern BP1-E and the second bridge pattern BP2-E.

The first patterns SP1-E and the second patterns SP2-E including the mesh lines MSL may include the protrusions TPP1 and TPP2 disposed between the bridge patterns BP1-E and BP2-E and the body TSP to reduce a length of each of the bridge patterns BP1-E and BP2-E. Thus, the protrusions TPP1 and TPP2, which prevent disconnection of the bridge patterns BP1-E and BP2-E and have areas greater than those of the bridge patterns BP1 and BP2-E may be disposed between the body TSP and the bridge patterns BP1-E ad BP2-E to improve the limitation in which the bridge patterns BP1-E and BP2-E are visually recognized by the user. The input sensor ISP-E having the improved visibility may be provided.

Figure 16:
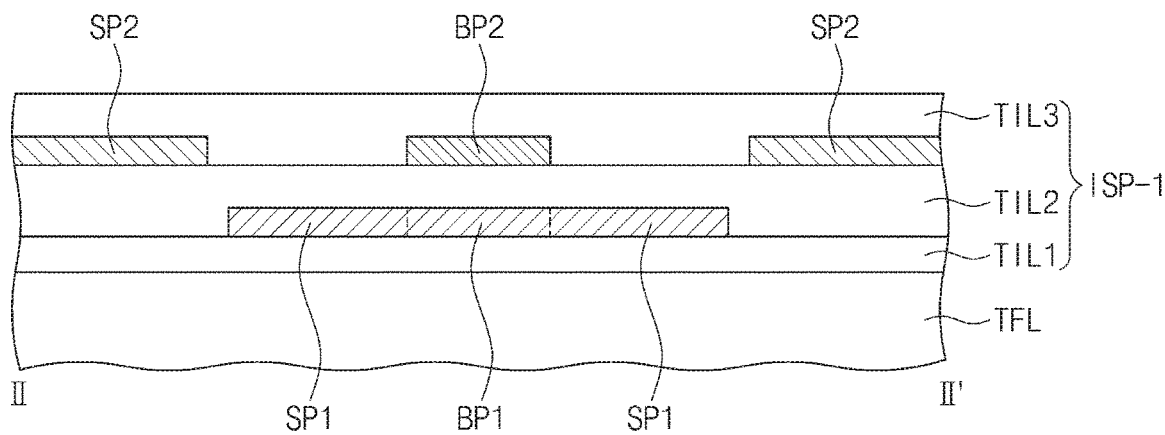
FIG. 16 is a cross-sectional view of the input sensor, taken along line II-II' of FIG. 5B according to an embodiment of the inventive concept.
Figure 17:
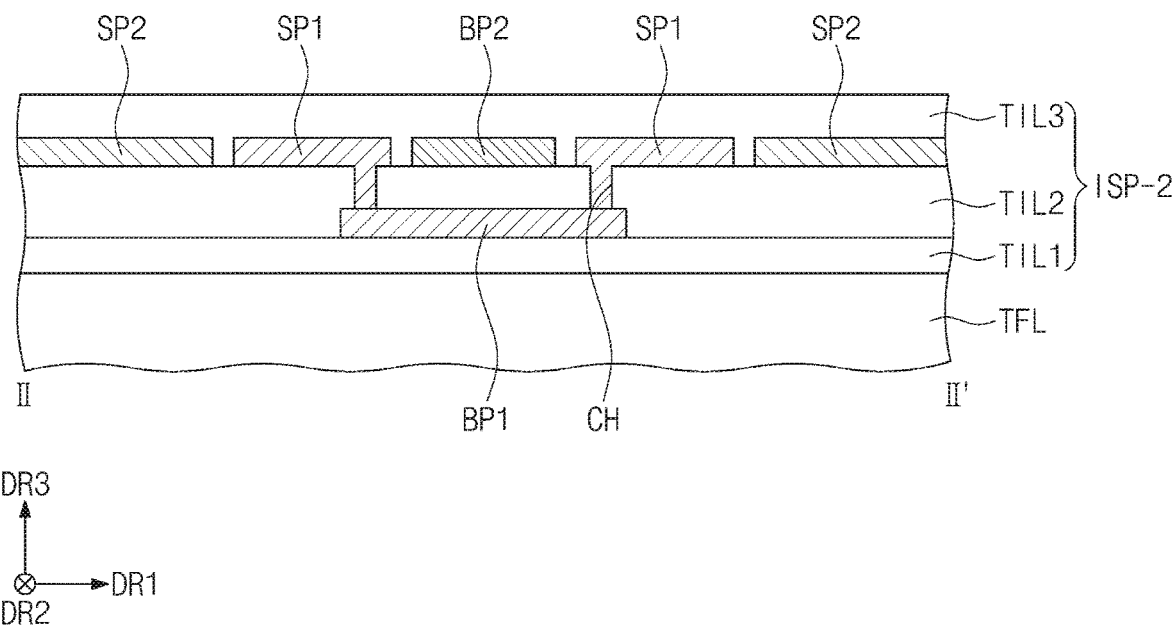
FIG. 17 is a cross-sectional view of the input sensor, taken along line II-II' of FIG. 5B according to an embodiment of the inventive concept.

FIG. 16 is a cross-sectional view of the input sensor, taken along line II-II' of FIG. 5B. FIG. 17 is a cross-sectional view of the input sensor, taken along line II-II' of FIG. 5B. FIG. 18 is a cross-sectional view of the input sensor, taken along line II-II' of FIG. 5B. The same/similar reference numerals are used for the same components as those of FIGS. 1A to 5B, and thus, their duplicated descriptions will be omitted. An upper insulating layer TFL described with reference to FIGS. 16 to 18 may correspond to the upper insulating layer TFL of FIG. 4.

Referring to FIG. 16, an input sensor ISP-1 according to an embodiment may be disposed on a top surface of the upper insulating layer TFL. In an embodiment, the input sensor ISP-1 is directly disposed on the top surface of the upper insulating layer TFL. The input sensor ISP-1 may include a first sensor insulating layer TILL a second sensor insulating layer TIL2, a third sensor insulating layer TIL3, and a plurality of patterns. In an embodiment of the inventive concept, the first sensor insulating layer TIL1 may be omitted.

The first sensor insulating layer TIL1 may be disposed on the upper insulating layer TFL. In an embodiment, the first sensor insulating layer TIL1 is directly disposed on the upper insulating layer TFL. First patterns SP1 and a first bridge pattern BP1 are disposed on the first sensor insulating layer TIL1. The first bridge pattern BP1 may be disposed between the first patterns SP1. The first bridge pattern BP1 may connect the first patterns SP1 with each other.

The second sensor insulating layer TIL2 is disposed on the first sensor insulating layer TIL1 to cover the first patterns SP1 and the first bridge pattern BP1. The second patterns SP2 and the second bridge pattern BP2 may be disposed on the second sensor insulating layer TIL2. Although not shown in a cross-sectional view taken along line the second bridge pattern BP2 may be disposed between the second patterns SP2 to connect the second patterns SP2 with each other. The first bridge pattern BP1 may overlap the second bridge pattern BP2 with the second sensor insulating layer TIL2 therebetween.

The third sensor insulating layer TIL3 is disposed on the second sensor insulating layer TIL2 to cover the second patterns SP2 and the second bridge pattern BP2.

The first conductive layer ICL1 described in FIG. 4 may be constituted by the first patterns SP1 and the first bridge pattern BP1, and the second conductive layer ICL2 may be constituted by the second patterns SP2 and the second bridge pattern BP2.

Referring to FIG. 17, an input sensor ISP-2 according to an embodiment may be directly disposed on a top surface of the upper insulating layer TFL. In an embodiment, the input sensor ISP-2 is directly disposed on the top surface of the upper insulating layer TFL. The input sensor ISP-2 may include a first sensor insulating layer TILL a second sensor insulating layer TIL2, a third sensor insulating layer TIL3, and a plurality of patterns. In an embodiment of the inventive concept, the first sensor insulating layer TIL1 may be omitted.

The first sensor insulating layer TIL1 may be disposed on the upper insulating layer TFL. For example, the first sensor insulating layer TIL1 is directly disposed on the upper insulating layer TFL. The first bridge pattern BP1 is disposed on the first sensor insulating layer TIL1. The first bridge pattern BP1 may overlap at least a portion of the first patterns SP1.

The second sensor insulating layer TIL2 is disposed on the first sensor insulating layer TIL1 to cover the first bridge pattern BP1. The first patterns SP1, the second patterns SP2, and the second bridge pattern BP2 may be disposed on the second sensor insulating layer TIL2. Although not shown in a cross-sectional view taken along line the second bridge pattern BP2 may be disposed between the second patterns SP2 to connect the second patterns SP2 spaced apart from each other to each other. The first patterns SP1 may be disposed to be spaced apart from the second patterns SP2 and the second bridge pattern BP2.

The second patterns SP2 may be connected to the first bridge pattern BP1 through a contact hole CH defined in the second sensor insulating layer TIL2.

The third sensor insulating layer TIL3 is disposed on the second sensor insulating layer TIL2 to cover the first patterns SP1, the second patterns SP2, and the second bridge pattern BP2.

The first conductive layer ICL1 described in FIG. 4 may be constituted by the first bridge pattern BP1, and the second conductive layer ICL2 may be constituted by the first patterns SP1, the second patterns SP2, and the second bridge pattern BP2.

Referring to FIG. 18, an input sensor ISP-3 according to an embodiment may be disposed on a top surface of the upper insulating layer TFL. In an embodiment, the input sensor ISP-3 is directly disposed on the top surface of the upper insulating layer TFL. The input sensor ISP-3 may include a first sensor insulating layer TIL1 a second sensor insulating layer TIL2, a third sensor insulating layer TIL3, and a plurality of patterns. In an embodiment of the inventive concept, the first sensor insulating layer TIL1 may be omitted.

The first pattern SP1 (see FIG. 5B) of the input sensor ISP-3 includes a first lower patterns SP1-*a*, a first upper patterns SP1-*b*, and a first bridge pattern BP1. The first lower patterns SP1-*a* and the first upper patterns SP1-*b* may have the same shape. Thus, the first lower patterns SP1-*a* and the first upper patterns SP1-*b* may be visually recognized as one pattern on the plane.

The first pattern SP1 (see FIG. 5B) includes a second lower patterns SP2-*a*, a second upper patterns SP2-*b*, and a second bridge pattern BP2. The second lower patterns SP2-*a* and the second upper patterns SP2-*b* may have the same shape. Thus, the second lower patterns SP2-*a* and the second upper patterns SP1-*b* may be visually recognized as one pattern on the plane.

The first sensor insulating layer TIL1 may be directly disposed on the upper insulating layer TFL. In an embodiment, the first sensor insulating layer TIL1 is directly disposed on the upper insulating layer TFL. The first lower patterns SP1-*a*, the first bridge pattern BP1, and the second lower patterns SP2-*a* are disposed on the first sensor insulating layer TIL1 The first bridge pattern BP1 may connect the first lower patterns SP1-*a* with each other. The second lower patterns SP2-*a* may be spaced apart from the first lower patterns SP1-*a* and the first bridge pattern BP1.

The second sensor insulating layer TIL2 is disposed on the first sensor insulating layer TIL1 to cover the first lower patterns SP1-*a*, the first bridge pattern BP1, and the second lower patterns SP2-*a*.

The first upper patterns SP1-*b*, the second upper patterns SP2-*b*, and the second bridge pattern BP2 may be disposed on the second sensor insulating layer TIL2. Although not shown in the cross-sectional view taken along line the second bridge pattern BP2 may be disposed between the second upper patterns SP2-*b* to connect the second upper patterns SP2-*b* with each other. The first upper patterns SP1-*b* may be spaced apart from the second upper patterns SP2-*b* and the second bridge pattern BP2.

The first upper patterns SP1-*b* may be connected to the overlapping first lower patterns SP1-*a* through a first contact hole CH1 defined in the second sensor insulating layer TIL2. The second upper patterns SP2-*b* may be connected to the overlapping second lower patterns SP2-*a* through a second contact hole CH2 defined in the second sensor insulating layer TIL2.

The first conductive layer ICL1 described in FIG. 4 may be constituted by the first lower patterns SP1-*a*, the first bridge pattern BP1, and the second conductive layer ICL2 may be constituted by the first upper patterns SP1-*b*, the second upper patterns SP2-*b*, and the second bridge pattern BP2.

According to the embodiment of the inventive concept, the patterns constituting the nodes may be alternately disposed with each other to secure the signal uniformity according to the position of the input applied to the input sensor. Since the plurality of patterns are disposed on one node, the active type signal as well as the passive type signal may also increase. Therefore, the electronic apparatus including the input sensor having the improved sensing sensitivity may be provided.

It will be apparent to those skilled in the art that various modifications and deviations can be made in the present invention. Thus, it is intended that the present disclosure covers the modifications and deviations of this invention provided they come within the scope of the appended claims and their equivalents.

Accordingly, the technical scope of the present invention should not be limited to the contents described in the detailed description of the specification, but should be determined by the claims.

What is claimed is:
1. An electronic apparatus comprising:
a display panel; and
an input sensor disposed on the display panel and comprising a first electrode extending in a first direction, a second electrode extending in a second direction crossing the first direction and insulated from the first electrode, a first sensing line connected to the first electrode, and a second sensing line connected to the second electrode,
wherein the first electrode comprises:
a plurality of first patterns, which are spaced apart from each other, and each first pattern comprising a first side extending in the second direction and a second side extending in the first direction, wherein the second side is longer than the first side; and
a plurality of first bridge patterns, each first bridge pattern being disposed between a corresponding pair of two first patterns adjacent to each other,
wherein the second electrode comprises:
a plurality of second patterns, which are spaced apart from each other, and each second pattern comprising a third side extending in the first direction and a fourth side extending in the second direction, wherein the fourth side is longer than the third side; and a plurality of second bridge patterns, each second bridge pattern being disposed between a corresponding pair of two second patterns adjacent to each other, wherein each first pattern of the plurality of first patterns and each second pattern of the plurality of second patterns are alternately disposed in each of the first direction and the second direction, wherein the first side faces the fourth side, and wherein the second side faces the third side.

2. The electronic apparatus of claim 1, wherein the first electrode and the second electrode crosses each other at a node region, and wherein a first number of first patterns among the plurality of first patterns and a second number of second patterns among the plurality of second patterns are disposed in the node region.

3. The electronic apparatus of claim 2, wherein the first number of the first patterns and the second number of the second patterns are the same as each other.

4. The electronic apparatus of claim 2, wherein the first number of the first patterns and the second number of the second patterns are different from each other.

5. The electronic apparatus of claim 1, wherein the plurality of first bridge patterns and the plurality of second bridge patterns extend in a diagonal direction between the first direction and the second direction.

6. The electronic apparatus of claim 1, wherein the first side and the fourth side extend in a first diagonal direction between the first direction and the second direction, and wherein the second side and the third side extend in a second diagonal direction, different from the first diagonal direction, between the first direction and the second direction.

7. The electronic apparatus of claim 1, wherein the plurality of first patterns include a first pattern with a first pattern hole, and wherein the plurality of second patterns include a second pattern with a second pattern hole.

8. The electronic apparatus of claim 7, further comprising:

a first dummy pattern within the first pattern hole of the first pattern and insulated from the first pattern; and a second dummy pattern within the second pattern hole of the second pattern and insulated from the second pattern.

9. The electronic apparatus of claim 7, wherein the plurality of first patterns include a third pattern with a third pattern hole, and wherein the first pattern hole and the second pattern hole have areas different from each other.

10. The electronic apparatus of claim 1, wherein the plurality of first patterns include a first pattern with a first recess which is inwardly recessed from the second side, and wherein the plurality of second patterns include a second pattern with a second recess which is inwardly recessed from the fourth side.

11. The electronic apparatus of claim 10, further comprising:

a first dummy pattern disposed in the first recess of the first pattern and insulated from the first pattern; and a second dummy pattern disposed in the second recess of the second pattern and insulated from the second pattern.

12. The electronic apparatus of claim 1, wherein each of the plurality of first patterns includes a plurality of first mesh lines which are extend in a diagonal direction between the first direction and the second direction and a plurality of first mesh openings which are defined by the plurality of first mesh lines, and wherein each of the plurality of second patterns includes a plurality of second mesh lines which are extend in a diagonal direction between the first direction and the second direction and a plurality of second mesh openings which are defined by the plurality of second mesh lines.

13. The electronic apparatus of claim 12, wherein each of the plurality of first patterns comprises:

a body of which an outer boundary is of a rectangular shape; and a first protrusion protruding from a first portion of the outer boundary of the body.

14. The electronic apparatus of claim 13, wherein each of the plurality of first patterns further comprises:

a second protrusion protruding from a second portion of the outer boundary of the body and spaced apart from the first protrusion, wherein the first protrusion is connected to a corresponding bridge pattern of the plurality of first bridge patterns, and wherein the second protrusion is connected to a corresponding bridge pattern of the plurality of first bridge patterns.

15. The electronic apparatus of claim 1, wherein the display panel comprises:

a base layer;

a circuit element layer disposed on the base layer and comprising a transistor;

a display element layer comprising a light emitting element connected to the transistor; and an upper insulating layer covering the display element layer, wherein the input sensor is directly disposed on the upper insulating layer.

16. The electronic apparatus of claim 1, wherein the input sensor comprises:

a first sensor insulating layer disposed on the display panel;

a first conductive layer disposed on the first sensor insulating layer;

a second sensor insulating layer disposed on the first sensor insulating layer to cover the first conductive layer; and a second conductive layer disposed on the second sensor insulating layer.

17. The electronic apparatus of claim 16, wherein the first conductive layer includes the plurality of first bridge patterns, wherein the second conductive layer includes the plurality of first patterns, the plurality of second patterns, and the plurality of second bridge patterns, and wherein each first bridge pattern of the plurality of first bridge patterns is connected to the corresponding pair of two first patterns through of a corresponding pair of two contact holes, respectively, which pass through the second sensor insulating layer.

18. The electronic apparatus of claim 16,
wherein the plurality of first patterns comprise a plurality of first upper patterns and a plurality of first lower patterns, each first upper pattern vertically overlapping a corresponding first lower pattern of the plurality of first lower patterns and having the same as the corresponding first lower pattern, and each of the plurality of first bridge patterns connecting a pair of two first lower patterns, adjacent to each other, among the plurality of first lower patterns,
wherein the plurality of second patterns comprise a plurality of second upper patterns and a plurality of second lower patterns, each second upper pattern vertically overlapping a corresponding second lower pattern of the plurality of second lower patterns and having the same as the corresponding second lower pattern, and each of the plurality of second bridge patterns connecting a pair of two second upper patterns, adjacent to each other, among the plurality of second upper patterns,
wherein the first conductive layer includes the plurality of first lower patterns, the plurality of first bridge patterns, and the plurality of second lower patterns, and
wherein the second conductive layer includes the plurality of first upper patterns, the plurality of second upper patterns, and the plurality of second bridge patterns.

19. The electronic apparatus of claim 18,
wherein each of the plurality of first upper patterns is connected to a corresponding one of the plurality of first lower patterns through a first contact hole pass through the second sensor insulating layer, and
wherein each of the plurality of second upper patterns is connected to a corresponding one of the plurality of second lower patterns through a second contact hole passing through the second sensor insulating layer.

* * * * *